(12) United States Patent
Morisaki et al.

(10) Patent No.: US 11,530,103 B2
(45) Date of Patent: Dec. 20, 2022

(54) SHEET FEEDING DEVICE, IMAGE READING DEVICE, AND IMAGE FORMING APPARATUS

(71) Applicants: Ryohei Morisaki, Kanagawa (JP); Shigefumi Soga, Kanagawa (JP); Chisa Kato, Kanagawa (JP)

(72) Inventors: Ryohei Morisaki, Kanagawa (JP); Shigefumi Soga, Kanagawa (JP); Chisa Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 106 days.

(21) Appl. No.: 17/021,215

(22) Filed: Sep. 15, 2020

(65) Prior Publication Data
US 2021/0087007 A1    Mar. 25, 2021

(30) Foreign Application Priority Data

Sep. 20, 2019  (JP) .............................. JP2019-172198
Apr. 13, 2020  (JP) .............................. JP2020-071564

(51) Int. Cl.
| | | |
|---|---|---|
| B65H 5/06 | (2006.01) | |
| B65H 9/16 | (2006.01) | |
| H04N 1/00 | (2006.01) | |
| H04N 1/12 | (2006.01) | |
| B65H 7/02 | (2006.01) | |

(52) U.S. Cl.
CPC .............. *B65H 5/062* (2013.01); *B65H 7/02* (2013.01); *B65H 9/166* (2013.01); *H04N 1/00588* (2013.01); *H04N 1/1215* (2013.01); *B65H 2405/11161* (2013.01); *B65H 2405/1412* (2013.01); *B65H 2511/13* (2013.01); *B65H 2513/10* (2013.01)

(58) Field of Classification Search
CPC . B65H 5/062; B65H 7/02; B65H 7/20; B65H 9/004; B65H 9/006; B65H 29/12; B65H 29/70; B65H 2405/1112; B65H 2405/1116; B65H 2405/11161; B65H 2405/141; B65H 2405/1412; B65H 2511/13; B65H 2513/10; H04N 1/00588; H04N 1/1215
See application file for complete search history.

(56) References Cited

U.S. PATENT DOCUMENTS 5,918,876 A * 7/1999 Maruyama ............... B65H 7/08
                                                              271/274
6,151,478 A * 11/2000 Katsuta .............. H04N 1/00602
                                                              399/374

(Continued)

FOREIGN PATENT DOCUMENTS

JP         2007-171763         7/2007

*Primary Examiner* — Prasad V Gokhale
(74) *Attorney, Agent, or Firm* — Harness, Dickey & Pierce, P.L.C.

(57) ABSTRACT

A sheet feeding device includes a roller pair being mutually non-separable; and a roller pair being mutually separable. The sheet feeding device temporarily stops a sheet in a registration position of the non-separable roller pair and then resumes feeding the sheet. The sheet feeding device feeds sheets such that a following sheet reaches the registration position from the separable roller pair after completion of ejection of a preceding sheet.

16 Claims, 17 Drawing Sheets

(56) References Cited

U.S. PATENT DOCUMENTS

| | | | |
|---|---|---|---|
| 6,206,359 B1* | 3/2001 | Hirota | H04N 1/00567 |
| | | | 399/365 |
| 2002/0125632 A1* | 9/2002 | Aoki | B65H 7/02 |
| | | | 271/279 |
| 2007/0146825 A1 | 6/2007 | Ito et al. | |
| 2009/0152792 A1 | 6/2009 | Kato et al. | |
| 2012/0080836 A1 | 4/2012 | Morisaki | |
| 2017/0355541 A1* | 12/2017 | Koyama | B65H 31/04 |
| 2020/0329164 A1* | 10/2020 | Sato | H04N 1/1215 |
| 2021/0107301 A1* | 4/2021 | Takimoto | B41J 11/0045 |

* cited by examiner

SHEET FEEDING DEVICE, IMAGE READING DEVICE, AND IMAGE FORMING APPARATUS

CROSS-REFERENCE TO RELATED APPLICATIONS

The present application claims priority under 35 U.S.C. § 119 to Japanese Patent Application No. 2019-172198, filed on Sep. 20, 2019 and Japanese Patent Application No. 2020-071564, filed on Apr. 13, 2020. The contents of which are incorporated herein by reference in their entirety.

BACKGROUND OF THE INVENTION

1. Field of the Invention

The present invention relates to a sheet feeding device, an image reading device, and an image forming apparatus.

2. Description of the Related Art

Conventionally, sheet feeding devices are known, which temporarily stop feeding a sheet at a registration position located upstream of an image reading position in the feeding direction, and then resume feeding the sheet.

For example, a sheet feeding device feeds a sheet of document from a feeding tray by a separating feeder, temporarily stops feeding the document at the time when the leading end of the document reaches a feeding nip (registration position) of a pre-reading roller located before the reading position, and feeds the document at a sheet reading/feeding speed the same as image reading speed, and ejects the document to a paper ejection tray (described in Japanese Unexamined Patent Application Publication No. 2007-171763, for example).

However, such a sheet feeding device may fail in ejecting sheets, which may cause damage of a sheet the remaining in the device when removing the sheet therefrom.

SUMMARY OF THE INVENTION

According to one aspect of the present invention, a sheet feeding device includes a roller pair being mutually non-separable; and a roller pair being mutually separable. The sheet feeding device temporarily stops a sheet in a registration position of the non-separable roller pair and then resumes feeding the sheet. The sheet feeding device feeds sheets such that a following sheet reaches the registration position from the separable roller pair after completion of ejection of a preceding sheet.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
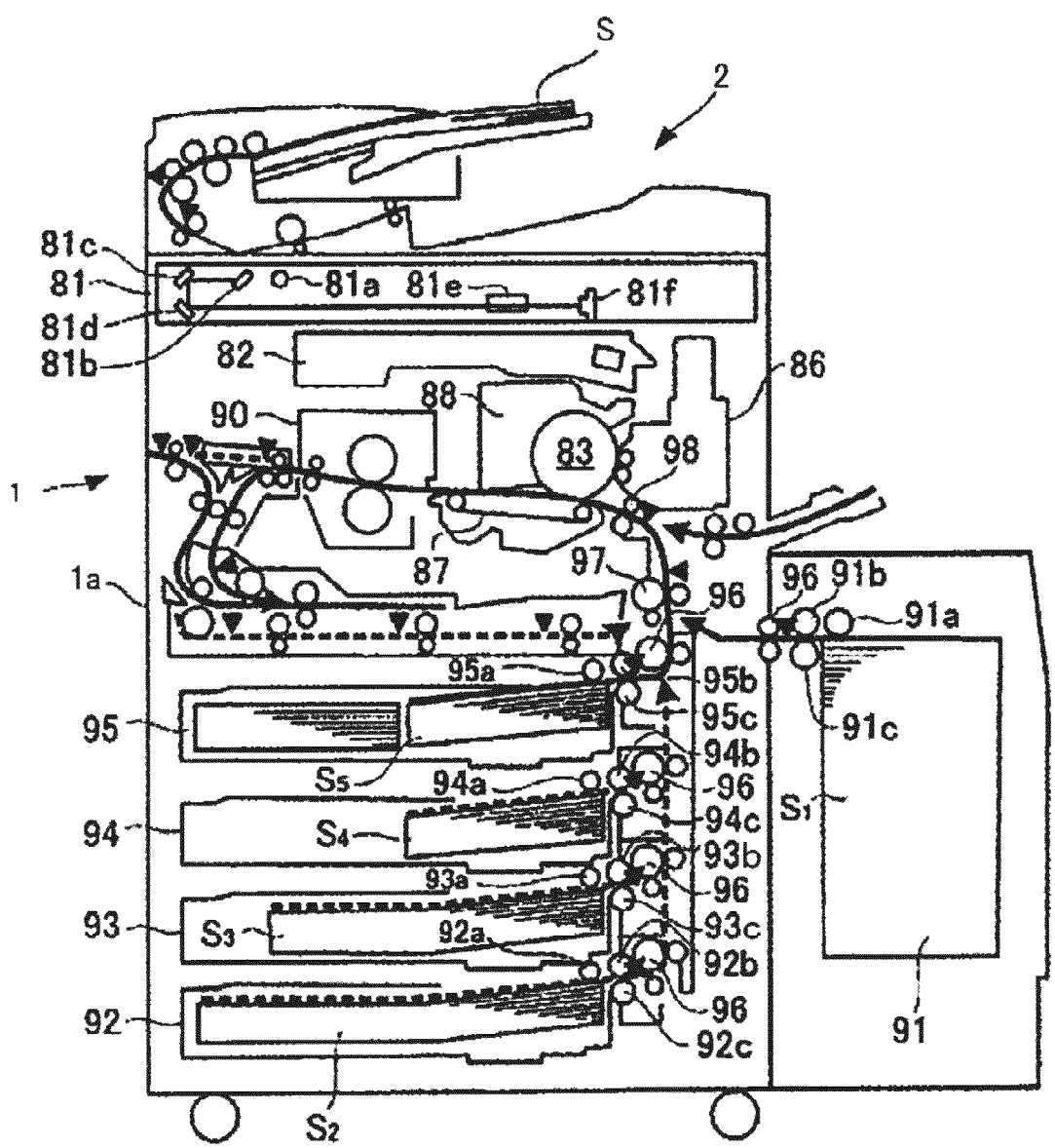
FIG. 1 is a schematic configuration diagram of an automatic document feeder and an image forming apparatus including the automatic document feeder according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An object of the present invention is to provide a sheet feeding device that can feed sheets such that a following sheet reaches a registration position from a separable roller pair after completion of ejection of a preceding sheet.

An embodiment of the present invention will be described in detail below with reference to the accompanying drawings. The following will describe an embodiment of an image forming apparatus to which the present invention is applied. FIG. 1 is a schematic configuration diagram of an automatic document feeder 2 and an image forming apparatus including the automatic document feeder 2 according to the embodiment.

As illustrated in FIG. 1, an image forming apparatus 1 includes the automatic document feeder 2 serving as a sheet feeding device which feeds sheets of document S, and a main unit 1a which reads the document and forms an image thereof on a sheet of paper. The automatic document feeder 2 is openable and closable with respect to the main unit 1a via a hinge mechanism.

The main unit 1a accommodates an image reader 81. The image reader 81 reads image information, and a writer 82 irradiates a photoconductor drum 83 with the image information. The automatic document feeder 2 and the image reader 81 constitute an image reading device.

The image reader 81 includes a light source 81a that illuminates the document on a contact glass 3 (see FIG. 2) or a slit glass 4 (see FIG. 2), a first mirror 81b, a second mirror 81c, and a third mirror 81d each of which reflects light from the document S, a lens 81e that images the light reflected by the third mirror 81d on a CCD image sensor 81f, and the CCD image sensor 81f that converts the light imaged by the lens 81e into an electrical signal.

The light source 81a and the first mirror 81b are attached to a first movable member. The second mirror 81c and the third mirror 81d are attached to a second movable member. The first movable member and the second movable member move along the contact glass 3 (see FIG. 2) and the slit glass 4 (see FIG. 2).

The first movable member and the second movable member move from left to right under the contact glass 3 in FIG. 1 in reading the document S set on the contact glass 3, and stop under the slit glass 4 in reading the document passing through the slit glass 4.

The writer 82 emits laser light, which is modulated in accordance with the image information read by the image reader 81, and expose the charged surface of the photoconductor drum 83 with the laser light.

A developing device 86, a transfer belt 87, a cleaning device 88, a charging device, and a neutralization device are disposed around the photoconductor drum 83. The developing device 86 and the photoconductor drum 83 together constitute image forming means. The charging device works to control corona discharge of a positive charge with a grid in the dark and charges the surface of the photoconductor drum 83 at a certain potential.

The writer 82 irradiates the photoconductor drum 83 charged with the certain potential with laser diode light containing image information, removes negative charge on the photoconductor drum 83, and forms an electrostatic latent image.

The developing device 86 attaches negatively charged toner to a neutralized part of the photoconductor drum 83 to form a visible image. A positive bias is applied to the transfer belt 87. The transfer belt 87 serves to transfer the negatively charged visible image onto a sheet of paper serving as a recording medium, and convey the sheet.

The cleaning device 88 includes a cleaning blade to scrape off remaining toner from the photoconductor drum 83. The neutralization device includes an LED inside, and the LED lights on to remove remaining charge from the photoconductor drum 83 to prepare for forming a new image on the next sheet of paper. The sheet of paper on which the image is formed through the above process is conveyed to a fixing device 90. The fixing device 90a fixes a toner image thereon, and an ejection roller pair ejects the sheet to the outside of the image forming apparatus 1.

In the lower part of the main unit 1a, paper cassettes 92 to 95 that store sheets of paper ($S_2$ to $S_5$). The right side of the main unit 1a is connected to a large-capacity paper feeding unit 91 containing sheets of paper ($S_1$) in FIG. 1. The sheets of paper are fed by rollers 91a to 95a from the paper cassettes 92 to 95 and the large-capacity paper feeding unit 91, slide with paper feeding rollers 91b to 95b rotating in the feeding direction, and are separated by reverse rollers 91c to 95c rotating in a separating direction.

The separated sheets of paper are conveyed to a registration roller pair 98 through relay roller pairs 96 and 97 which can move away from each other by opening and closing the side cover of the main unit 1a. The registration roller pair 98 does not move away from each other irrespective of opening and closing of the side cover. The sheets of paper are conveyed to a feeding path between the photoconductor drum 83 and the transfer belt 87 at timing set by the registration roller pair 98.

Figure 2:
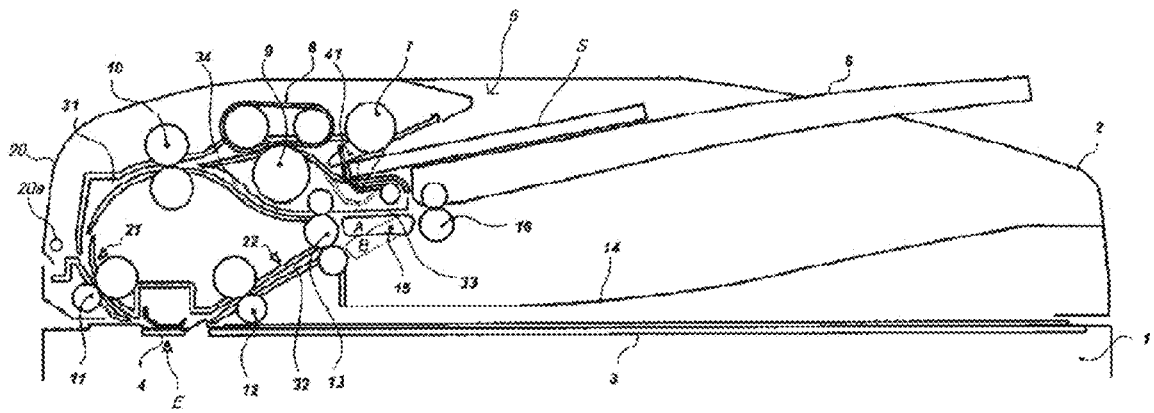
FIG. 2 is a schematic configuration diagram of the automatic document feeder.

FIG. 2 is a schematic configuration diagram of the automatic document feeder 2. The automatic document feeder 2 includes a paper feeder and separator 6 that feeds and separates the sheet of document S, a first feeding path 31, a second feeding path 32, a third feeding path 33, and a fourth feeding path 34 of the document S in which a plurality of feeding roller pairs are placed, and an ejection unit 14 serving as an ejection tray on which the documents S ejected to the outside of the device are stacked.

The paper feeder and separator 6 of the automatic document feeder 2 is provided with a document placement table 5 serving as sheet placement into which a bundle of documents S is inserted and set, a setting sensor 41 that senses the document set on the document placement table 5, a paper feeding roller 7 that feeds the set bundle of documents, a paper feeding belt 8 and a reverse roller 9 that successively separately feed the document sheets fed by the paper feeding roller 7 one by one from the uppermost sheet, and a pull-out roller pair 10 being separable from each other.

The reverse roller 9 and the lower one of the pull-out roller pair 10 are located in the body of the automatic document feeder 2. The paper feeding roller 7, the paper feeding belt 8, and the upper one of the pull-out roller pair 10 are located in an upper cover 20 that rotates around a shaft 20a. The lower one of the pull-out roller pair 10 serves as a drive roller while the upper one of the pull-out roller pair 10 serves as a driven roller. The paper feeding belt 8 is separable from the reverse roller 9 along with opening and closing of the upper cover 20. The upper driven roller of the pull-out roller pair 10 is separable from the lower drive roller along with opening and closing of the upper cover 20.

The paper feeding roller 7 typically stands by with given spacing from the document placement table 5. When the sensor detects the bundle of documents set on the document placement table 5 and the operating unit issues an instruction to start reading, the paper feeding roller 7 descends from the standby position, and moves to contact the uppermost surface of the bundle of documents.

Figure 20:
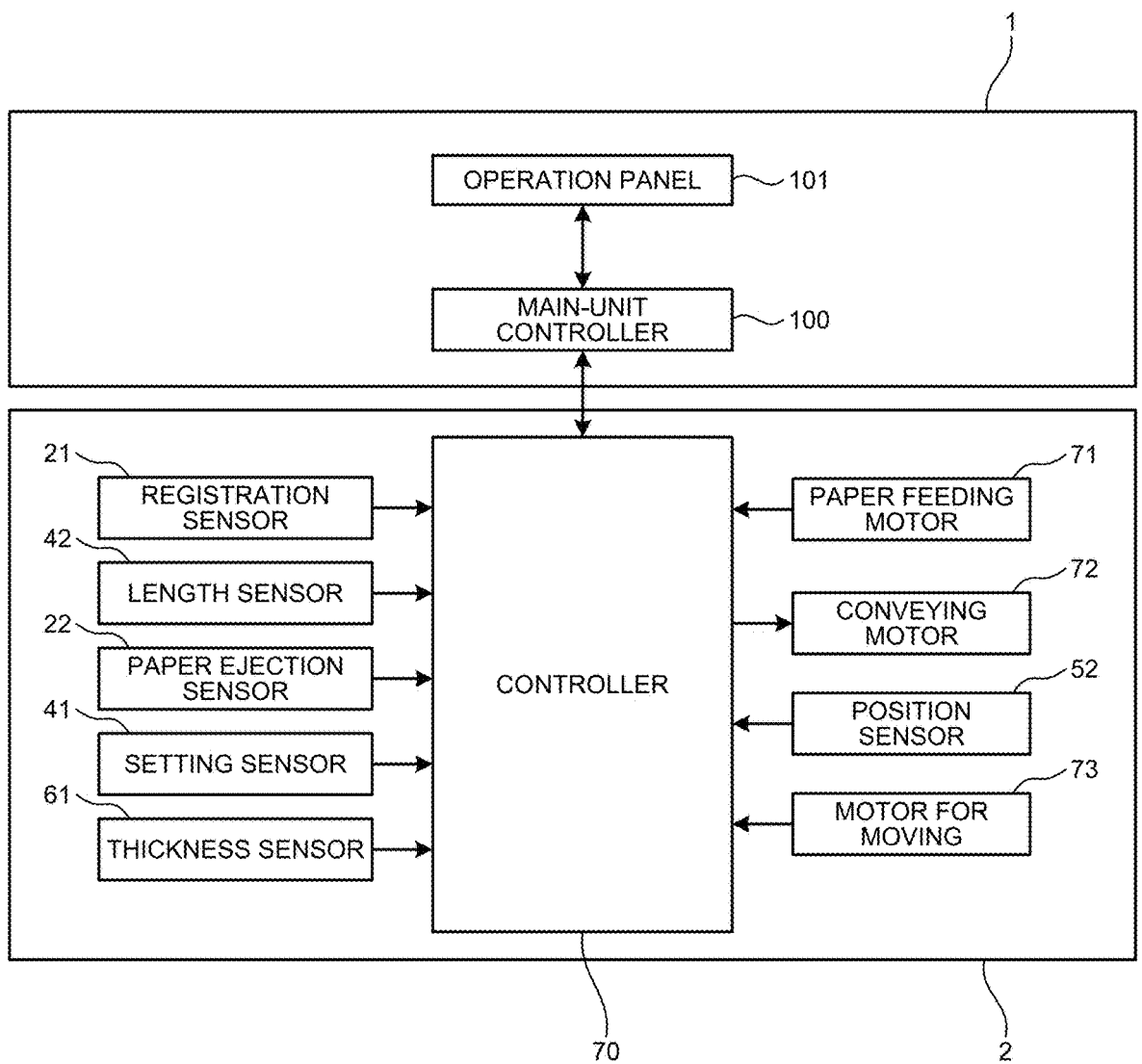
FIG. 20 is a diagram illustrating an example of control blocks of the automatic document feeder.

The paper feeding belt 8 extends between the drive roller and the driven roller, and endlessly moves clockwise in the drawing by rotation of the drive roller along with normal rotation of a paper feeding motor 71 (see FIG. 20). The reverse roller 9 abuts against the lower surface of the paper feeding belt 8, and receives the driving force of the paper feeding motor 71 through a torque limiter.

The reverse roller 9 abuts against the paper feeding belt 8 at given pressure to form a separation nip. While the reverse roller 9 is in direct contact with the paper feeding belt 8 or when a single document S is held in the contact part, the force acting in the document feeding direction exceeds the torque of the torque limiter. Thus, the reverse roller 9 receives no driving force of the paper feeding motor 71, and the reverse roller 9 rotates together with the paper feeding belt 8 or the document S. By contrast, when two or more document sheets S are held in the contact part, the force (rotational force) acting in the document feeding direction is smaller than the torque of the torque limiter. For this reason, the reverse roller 9 receives the driving force of the paper feeding motor 71 through the torque limiter, and rotates clockwise in the drawing reversely to the rotational direction. Thereby, the sheets of document S below the uppermost sheet are applied with moving force from the reverse roller 9 in a direction opposite to the document feeding direction, and only the uppermost sheet is separated from the two or more sheets of the document S. This can prevent overlapping paper feeding.

The pull-out roller pair 10 serves to correct inclination or skew of the document along the width and convey the corrected document to a pre-reading roller pair 11.

Downstream of the paper feeder and separator 6 in the document feeding direction, the first feeding path 31 is located. The first feeding path 31 serves to convey the separated document sheet S to an image reading position E where the sheet of the document S passes between the slit glass 4 and an opposite plate. The first feeding path 31 is provided with the pre-reading roller pair 11 and a registration sensor 21. The pre-reading roller pair 11 is a first roller pair upstream of the reading position E in the sheet feeding direction, and works to convey the introduced document S from the feeding path to the reading position E. The registration sensor 21 is located upstream of the pre-reading roller pair 11, and detects the leading end of the document.

The second feeding path 32 is located downstream of the reading position E in the document feeding direction. The second feeding path 32 is provided with a post-reading roller pair 12, an ejection roller pair 13, and a paper ejection sensor 22 located between the post-reading roller pair 12 and the ejection roller pair 13. An ejection unit 14 is located downstream of the ejection roller pair 13 in the second feeding path 32 in the document feeding direction. The ejection unit 14 includes a vertical rear-end guide and a sheet placement surface. The rear end guide is located directly vertically below the lower one, i.e., driven roller, of the ejection roller pair 13 and works to adjust the rear ends of the ejected documents. The sheet placement surface is inclined upward downstream of the feeding direction.

Downstream of the ejection roller pair 13 of the second feeding path 32 in the document feeding direction, the third feeding path 33 is located. The third feeding path 33 serves to switch back the document S from the second feeding path 32 and convey the document S again from the rear end toward the first feeding path 31. The third feeding path 33 is provided with an inversion roller pair 16 and a switching tab 15. The inversion roller pair 16 includes drive means for switching normal rotation and reverse rotation, normally rotates to introduce the document S ejected from the ejection roller pair 13 into the third feeding path 33, and reversely rotates to convey the document S from the third feeding path 33 to the fourth feeding path 34. The switching tab 15 is swingably supported by the third feeding path 33 to switch the destination of the document S from the second feeding path 32 to the ejection unit 14 or the third feeding path 33. The switching tab 15 is switched to a position indicated by the broken line in the drawing to guide the document S ejected from the ejection roller pair 13 to the third feeding path 33. After the document S is introduced into the third feeding path 33, the switching tab 15 is switched to a position indicated by the solid line to guide the document S, switched back in the third feeding path 33, to the fourth feeding path 34 from the rear end. The fourth feeding path 34 is provided with an upper driven roller for paper ejection that abuts against the drive roller of the ejection roller pair 13. The fourth feeding path 34 serves to return, to the first feeding path 31, the document S switched back from the third feeding path 33 by the drive roller of the ejection roller pair 13 and the upper driven roller.

The lower roller of the pull-out roller pair 10 is a drive roller, and the upper roller of the pre-reading roller pair 11 is a drive roller. The upper roller of the post-reading roller pair 12 is a drive roller, the center of the ejection roller pair 13 is a drive roller, and the upper roller of the inversion roller pair 16 is a drive roller. The drive rollers form a nip together with the paired driven rollers. In the pre-reading roller pair 11, the post-reading roller pair 12, and the ejection roller pair 13, the drive rollers are larger in diameter than the driven rollers. In the inversion roller pair 16, the drive roller is smaller in diameter than the diameter of the driven roller. In the pull-out roller pair 10, the drive roller is substantially equal in diameter to the driven roller.

The roller pairs are arranged with intervals of less than 100 mm in the document feeding direction, which enables feeding of paper of a small size up to approximately 100 mm, such as A4 size and B5 size. The drive roller of the post-reading roller pair 12 is larger in diameter by approximately 0.5% than the drive roller of pre-reading roller pair 11, so that the post-reading roller pair 12 conveys the documents at a higher speed by approximately 0.5% than the post-reading roller pair 12. Thereby, the document S is prevented from bending while being read in the reading position E.

The paper feeding roller 7, the paper feeding belt 8, the reverse roller 9, the pull-out roller pair 10, and the inversion roller pair 16 are driven by the paper feeding motor 71 (see FIG. 20), and the pre-reading roller pair 11, the post-reading roller pair 12, and the ejection roller pair 13 are driven by a conveying motor 72 (see FIG. 20). The pre-reading roller pair 11, the post-reading roller pair 12, and the ejection roller pair 13 are not mutually separable.

The pull-out roller pair 10 is supplied with the driving force from reverse rotation of the paper feeding motor 71 and rotated. The paper feeding roller 7, the paper feeding belt 8, and the reverse roller 9 are supplied with the driving force from normal rotation of the paper feeding motor 71 and rotated.

A stamp unit may be provided below the second feeding path 32 to put a stamp on a given position of the document after the image is read therefrom, in accordance with a user's instruction.

The following will describe operations of the document feeder until the document S is ejected to the ejection unit 14 after placed on the document placement table 5.

Single-Side Mode

The following will describe an example of setting a single-side mode in which an image of one side of the document is read. In the single-side mode, in response to a press onto a start button on an operation panel 101 (see FIG. 20), the document feeder checks from a detection signal from the setting sensor 41 whether the bundle of documents is set on the document placement table 5. The bundle of documents is placed on the document placement table 5 with the image surface to be read facing upward. After detection of the set document by the setting sensor 41, the paper feeding roller 7 descends and is pressed onto the bundle of documents. The paper feeding motor 71 is normally rotated to rotate the paper feeding roller 7 clockwise in the drawing and send the documents. The document sheets S sent by the paper feeding roller 7 are successively separated one by one with the paper feeding belt 8 and the reverse roller 9. The leading end of the document S enters the nip of the pull-out roller pair 10, and the document is subjected to skew correction. After skew correction, the paper feeding motor 71 is stopped and reversely rotated to rotate the pull-out roller pair 10 and convey the document S toward the pre-reading roller pair 11.

Having received a reading signal from the image forming apparatus 1 when the registration sensor 21 detects the leading end of the document S, the document feeder sets reading start timing to the reading position E, and the image reader 81 starts reading at the reading position E corresponding to the leading end of the document S. Having received no reading signal from the image forming apparatus 1 when the registration sensor 21 detects the leading end of the document S, the conveying motor 72 (see FIG. 20) is stopped to stop rotation of the pre-reading roller pair 11 and cause the document to temporarily stop or register at a feeding nip (registration position) of the pre-reading roller pair 11 before the image reading position. After receipt of a reading signal from the image forming apparatus 1, the conveying motor 72 resumes driving to convey the document to the reading position E by the pre-reading roller pair 11, and the image reader 81 reads the document at the reading position E.

After detection of the rear end of the document by the registration sensor 21, the image reader 81 sets read ending timing, to end reading at the rear end of the document S.

After passing the reading position E, the sheets of the document S are fed through the second feeding path 32, ejected to the ejection unit 14 by the ejection roller pair 13, and accumulated with the image surface facing downward. After the setting sensor 41 detects the bundle of documents on the document placement table 5 and the rear end of the preceding document passes through the pull-out roller pair 10, the paper feeding motor 71 (see FIG. 20) is temporarily stopped and then normally rotated to convey the following document S. After the operation described above, the paper feeding motor 71 is temporarily stopped while the leading end of the document enters the nip of the pull-out roller pair 10. Triggered by completion of reading the preceding document, the pull-out roller pair 10 resumes conveying the following document, and the following document is ejected to the ejection unit 14 through the above operation. By repeating such an operation, the document feeder ends the single-side processing to the bundle of documents on the document placement table 5.

Double-Side Mode

The following will describe an example of setting a double-side mode to read images on both sides of the bundle of documents placed on the document placement table 5. The upward facing surface of each document sheet set on the document placement table 5 is referred to as "first surface". The downward facing surface thereof is referred to as "second surface". In the double-side mode, in response to a press onto the start button on the operating unit, the document feeder checks from a detection signal from the setting sensor 41 whether a bundle of documents is set on the document placement table 5. The paper feeding roller 7 is rotated clockwise in the drawing, and feeds the document S. The document sheets S are fed to the first feeding path 31 by the paper feeding roller 7 and successively separated one by one with the paper feeding belt 8 and the reverse roller 9. Then, the leading end of the document S enters the nip of the pull-out roller pair 10, and the document is subjected to skew correction. After skew correction, the paper feeding motor 71 is stopped and rotated reversely to rotate the pull-out roller pair 10 and convey the document S to the pre-reading roller pair 11.

After detection of the leading end of the document S by the registration sensor 21, the image reader 81 sets read start timing, and starts reading the first surface of the document at the leading end of the document S. After detection of the leading end of the document S by the registration sensor 21, the switching tab 15 moves to the position indicated by the broken line in the drawing. After the paper ejection sensor 22 detects the leading end of the document S, the paper feeding roller 7 and the paper feeding belt 8 are released from driving by a clutch, for example, and do not feed the following document but stand by. After the registration sensor 21 detects the rear end of the document S, the image reader 81 sets reading end timing and ends reading at the rear end of the document S. Then, the ejection roller pair 13 conveys the document S to the third feeding path 33 on the switching tab 15 in the position indicated by the broken line in the drawing. After the rear end of the document passes through the ejection roller pair 13, the switching tab 15 is switched from the position indicated by the broken line to the position indicated by the solid line in the drawing. The inversion roller pair 16 is rotated reversely to guide the document to the fourth feeding path 34.

Having entered the fourth feeding path 34, the document is fed to the first feeding path 31, the second surface of the document S is subjected to image reading as in the first surface, and then fed to the third feeding path 33 again. The document is switched back and returned from the fourth feeding path 34 to the first feeding path 31. At this time, the document is not subjected to reading. In addition, after detection of the leading end of the document by the registration sensor 21, the switching tab 15 is maintained at the position indicated by the solid line, to eject the document to the ejection unit 14 with the first surface facing downward. Upon detection of a bundle of documents on the document placement table 5 by the setting sensor 41 at the time when the rear end of the document passes through the pull-out roller pair 10, the document feeder feeds the following document. The following document is temporarily stopped at the pull-out roller pair 10. The pull-out roller pair 10 resumes feeding the following document at the timing at which the rear end of the preceding document passes through the reading position E. The images on both surfaces of the document are read through the same operation as above. By repeating the operation above until the setting sensor 41 detects no document, double-sided document processing to the bundle of documents on the document placement table 5 is ended.

In an image forming apparatus including no hard disk drive that can store a large volume of read images by the image reader 81, waiting for writing to the memory may occur during printing process. It takes a longer time for such an image forming apparatus incorporating the automatic document feeder 2 from completion of reading the preceding document to transmission of a reading signal to the automatic document feeder to instruct for reading the following document. Because of this, the automatic document feeder 2 has received no reading signal from the image forming apparatus 1 when the leading end of the following document reaches the registration sensor 21 so that the conveying motor 72 (see FIG. 20) stops driving to temporarily stop the following document sheet for a certain period of time at the registration position (where the leading end of the document enters the nip of the pre-reading roller pair 11). In the present embodiment, the pre-reading roller pair 11, the post-reading roller pair 12, and the ejection roller pair 13 are driven by the conveying motor 72, therefore, the rear end (Sa) of the preceding document has not been ejected to the ejection unit 14 but stopped as illustrated in FIG. 3, when the conveying motor 72 stops driving to temporarily stop the following document at the registration position.

Figure 3:
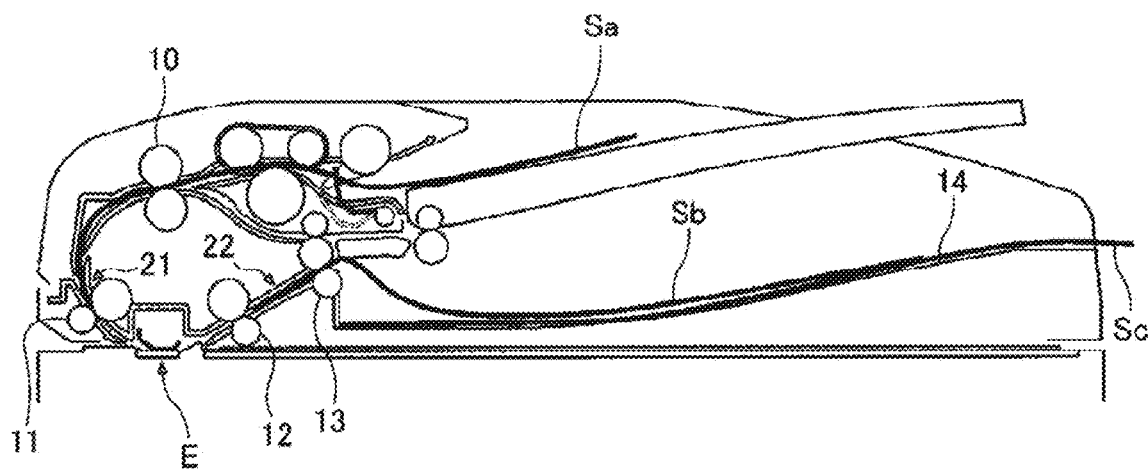
FIG. 3 is a diagram illustrating feeding of the document in a conventional automatic document feeder.

As illustrated in FIG. 3, the preceding document (Sb) except for the rear end has already been ejected to the ejection unit 14. The air between the part of the preceding document ejected to the ejection unit 14 and the document sheets set on the ejection unit 14 is released for a certain temporary stop period. Thereby, the ejected part of the preceding document closely contacts with the documents (Sc) set on the ejection unit 14. This increases the frictional force between the document set on the ejection unit 14 and the ejected part of the preceding document. This may result in ejection failure at the time of resuming the feeding, as follows. That is, the document set on the ejection unit 14 is fed together with the preceding document. Because of this, the set document falls from the ejection unit 14, or the ejected part of the preceding document does not slide on the document set on the ejection unit 14 and the rear end of the preceding document is ejected in a undulated manner, or the rear end remains on the ejection roller pair 13, or the rear end of the preceding document is not ejected, causing paper jam. In the case of documents of a larger size such as A3 size or documents of lower strength such as thin paper, in particular, the ejection failures as described above are likely to occur.

In view of this, the ejection roller pair 13 is driven by a motor different from the conveying motor 72 (see FIG. 20), or the driving force of the conveying motor 72 is transmitted to the pre-reading roller pair 11 via a clutch. Thereby, the rear end of the preceding document is continuously fed by the ejection roller pair 13, irrespective of temporary stop of the following document at the registration position of the pre-reading roller pair 11. However, this structure may lead to increasing the cost and/or size of the device.

The productivity of the automatic document feeder 2 may be set on the basis of the productivity of the image forming apparatus 1 incorporating the automatic document feeder 2. In such a case, in accordance with lower productivity of the image forming apparatus 1, approximately 27 sheets/minute, for example, the automatic document feeder 2 is also set to lower productivity of about 27 to 29 sheets/minute. Thus, lowering the productivity of the automatic document feeder 2 enables suppression of noise in the automatic document feeder 2. Due to the lower productivity of the automatic document feeder 2, the feeding speed (hereinafter referred to as "document reading/feeding speed") of the document passing through the image reading position (reading position E) is reduced to a low speed, such as 152.5 [mm/S]. In FIG. 3, the pre-reading roller pair 11, the post-reading roller pair 12, and the ejection roller pair 13 are driven by the conveying motor 72 (see FIG. 20). In addition, while the pre-reading roller pair 11 conveys the following document to the image reading position (reading position E), the rear end of the preceding document is not ejected to the ejection unit 14. As a result, the preceding document is read at the low speed of 152.5 [mm/S] and ejected to the ejection unit 14. Consequently, the rear end of the preceding document is not quickly ejected from the ejection roller pair 13 to the ejection unit 14, so that the rear end thereof is likely to remain on the lower roller of the ejection roller pair 13 adjacent to downstream of the nip of the ejection roller pair 13 in the feeding direction, or to be incompletely ejected to the ejection unit 14.

For this reason, the ejection roller pair 13 is driven by a motor different from the motor that drives the pre-reading roller pair 11 or the post-reading roller pair 12. After detection of the rear end of the document by the paper ejection sensor 22, the rotational speed of the ejection roller pair 13 is increased to quickly eject the document to the ejection unit 14. However, this may result in increasing the cost and/or size of the device.

Figure 4:
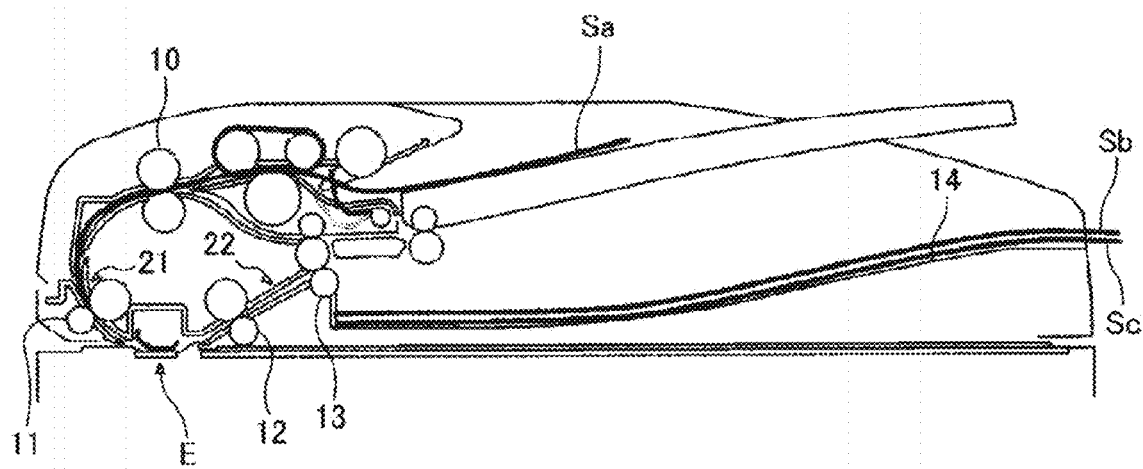
FIG. 4 is a diagram illustrating a characteristic part in the present embodiment.

FIG. 4 is a diagram illustrating a characteristic part of the present embodiment.

In the present embodiment, as illustrated in FIG. 4, the document feeder controls feeding of the following document such that the following document reaches the registration position after the rear end of the preceding document is ejected to the ejection unit 14 through the ejection roller pair 13. Specifically, after the registration sensor 21 or the paper ejection sensor 22 detects the rear end of the document, the ejection roller pair 13 is continuously rotated for a certain time to delay the start timing at which the pull-out roller pair 10 is driven. Thereby, the following document reaches the registration position after the preceding document is ejected to the ejection unit 14. As another example, the rotational speed of the pull-out roller pair 10 may be controlled to a lower speed to control the document feeding speed such that the following document reaches the registration position after the document is ejected to the ejection unit 14.

In this manner, for example, the automatic document feeder 2 incorporated in the image forming apparatus, which may cause waiting for write to the memory during printing process, can eject the preceding document to the ejection unit 14 without temporarily stopping along with a stop of the following document at the registration position. This can prevent the preceding document from tightly contacting the previously ejected document, which would otherwise occur due to gravity of the preceding document, and ensure ejection of the preceding document to the ejection unit 14. Thereby, the paper ejection failures described above can be avoided.

In addition, the following document reaches the registration position after the preceding document is ejected to the ejection unit 14, so that at the time of occurrence of ejection failure such as a paper jam, the following document can be removed without damage together with the preceding document remaining in the device, since the following document is not located at the pre-reading roller pair 11 being non-separable.

The document reading/feeding speed of the automatic document feeder 2 may be set to a lower speed in accordance with the productivity of the image forming apparatus. In such a case the rear end of the preceding document may be ejected at a feeding speed higher than the document reading/feeding speed. Specifically, upon detection of the rear end of the preceding document by the paper ejection sensor 22 located downstream the post-reading roller pair 12 in the feeding direction, the rotation speed of the conveying motor 72 is increased to increase the rotational speed of the ejection roller pair 13 downstream of the paper ejection sensor 22 in the feeding direction. Thereby, the rear side of the preceding document is ejected to the ejection unit 14 at a feeding speed higher than the document reading/feeding speed. This makes it possible to eject the rear side of the preceding document to the ejection unit 14 quickly, preventing the rear end from remaining in the device.

While the rear side of the preceding document is fed at a feeding speed higher than the document reading/feeding speed, the following document has not reached the pre-reading roller pair 11, therefore, it will not pass through the image reading position at a feeding speed higher than the document reading/feeding speed. Since the following document reaches the pre-reading roller pair 11 after the preceding document is ejected to the ejection unit 14, the rotational speed of the conveying motor 72 (see FIG. 20) can be decreased before or after the following document reaches there to set the feeding speed of the following document passing through the reading position E to the document reading/feeding speed.

Figure 5:
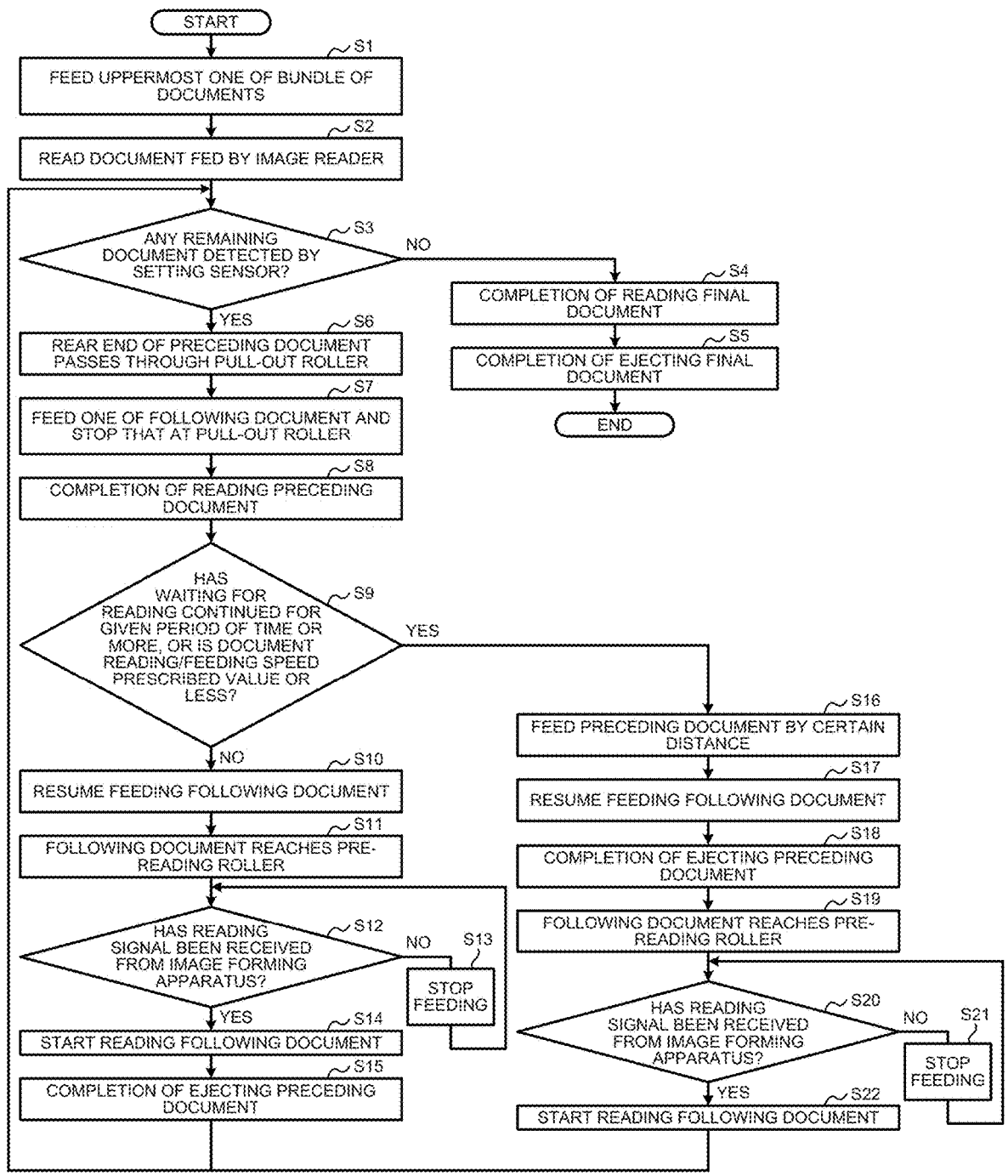
FIG. 5 is an operation flowchart of a single-side mode according to the present embodiment.

FIG. 5 is an operation flowchart of the single-side mode according to the present embodiment. As described above, the paper feeder and separator 6 feeds the upper most sheet of the bundle of documents set on the document placement table 5 (S1), and the image reader 81 reads the sheet (S2). If the setting sensor 41 detects no bundle of documents on the document placement table 5 (NO at S3), the document feeder determines the document being read by the image reader 81 as a final document, and determines completion of reading the final document (S4). The processing ends after the final document is ejected to the ejection unit 14 (S5).

Meanwhile, when the setting sensor 41 senses a bundle of documents on the document placement table 5 (YES at S3), the document feeder feeds the following document from the document placement table 5 after the rear end of the preceding document passes through the pull-out roller pair 10 (S6). The leading end of the following document contacts with the pull-out roller pair 10, and the following document is subjected to skew correction and temporarily stopped (S7).

The rear end of the preceding document passes through the image reading position, which completes reading of the preceding document (S8). It may take a given time or more for the image forming apparatus incorporating the automatic document feeder 2 to transmit a reading signal for the following document from completion of reading the preceding document (the rear end of the document passing through the reading position E), causing waiting for reading the following document for a given period of time or more (for example, in the case of the image forming apparatus including the automatic document feeder 2, having no HDD as described above). Alternatively, the document reading/feeding speed may be set to equal to or lower than the prescribed value (for example, in the case of the image forming apparatus including the automatic document feeder 2, having lower productivity and the document reading/feeding speed set to lower than the prescribed value) (YES at S9). In such a case the document feeder 2 delays the feeding start timing of the following document such that the following document reaches the registration position (nip of the pre-reading roller pair 11) after the preceding document is ejected to the ejection unit 14.

The time B by which the feeding start timing for the following document is delayed is preset to satisfy the relation B>C−A where A represents the time taken for feeding the following document from the pull-out roller pair 10 to the pre-reading roller pair 11, and C represents the time taken for feeding the preceding document from the reading position to the ejection roller pair 13. Instead of delaying the feeding start timing, the feeding speed may be decreased to allow the following document to reach the registration position (nip of the pre-reading roller pair 11) after the preceding document is ejected to the ejection unit 14. In this case, the feeding speed of the following document from the pull-out roller pair 10 to the pre-reading roller pair 11 is preset to satisfy the relation A>C.

A prescribed time passes after the rear end of the preceding document passes through the reading position E (completion of reading the preceding document), and the preceding document is fed by a certain distance (S16). Then, the pull-out roller pair 10 is rotated to resume feeding the following document (S17). After the preceding document is ejected to the ejection unit 14 (S18), the leading end of the following document reaches the pre-reading roller pair 11 (S19), and the registration sensor 21 detects the leading end of the following document.

After receiving a reading signal from the image forming apparatus (YES at S20), the document feeder feeds the following document to the reading position at the document reading/feeding speed to start reading the following document (S22). In the case of receiving no reading signal from the image forming apparatus (NO at S20), the document feeder temporarily stops feeding the following document at the registration position (the nip of the pre-reading roller pair 11) until receiving a reading signal (S21).

The automatic document feeder 2, when incorporated in the image forming apparatus in which waiting for write to the memory may occur in the printing process, may receive no reading signal from the image forming apparatus at the time when the leading end of the following document reaches the registration position. In such a case, the document feeder waits for reading and temporarily stops feeding the following document at the registration position for a given period of time, and then feeds the following document.

As described above, in the image forming apparatus in which waiting for reading may continue for a given period of time, the automatic document feeder 2 feeds the following document such that it reaches the pre-reading roller pair 11 after ejecting the preceding document. For this reason, a temporary feeding stop for a given period to wait for reading the following document does not affect ejection of the preceding document. Thereby, the automatic document feeder 2 can be prevented from ejection failure, such as ejection of an undulated rear side of the preceding document to the ejection unit 14, fall of a document from the ejection unit 14, and the leading end of the preceding document remaining on the ejection roller pair 13.

In the image forming apparatus with low productivity and the document reading/feeding speed set to a lower speed, the automatic document feeder 2 increases the feeding speed of the preceding document to higher than the document reading/feeding speed after the rear end of the preceding document passes through the image reading position and completion of reading the preceding document (S8), to quickly feed the rear end of the preceding document to the ejection unit 14.

Thus, with a lower document reading speed set, the following document reaches the pre-reading roller pair 11 after the preceding document is ejected, therefore, the rear end of the preceding document can be fed to the ejection unit 14 quickly by increasing the feeding speed of the preceding document to higher than the document reading/feeding speed. This can prevent occurrence of failure such as the rear end of the preceding document remaining on the ejection roller pair 13.

Meanwhile, in the image forming apparatus with high productivity and the document reading/feeding speed set to higher than the prescribed value, or the image forming apparatus including an HDD so that no waiting for reading occurs for a given period of time or more (NO at S9), the automatic document feeder 2 rotates the pull-out roller pair 10 to resume feeding the following document (S10) immediately after completion of reading the preceding document (S8). Having received a reading signal from the image forming apparatus (YES at S12) at the time when the registration sensor 21 detects the leading end of the following document reaching the pre-reading roller pair 11 (S11), the document feeder feeds the following document to the reading position at the document reading/feeding speed to start reading the following document (S14). Having received no reading signal from the image forming apparatus (NO at S13), the document feeder temporarily stops feeding the following document (S13) at the registration position (the nip of the pre-reading roller pair 11) until receiving a reading signal. When receiving a reading signal from the image forming apparatus, the document feeder resumes feeding the document, and starts reading the image of the following document (S14). Ejection of the preceding document to the ejection unit 14 is completed (S15) at given timing after start of reading the following document (after the leading end of the following document reaches the reading position).

The control unit (main-unit controller 100 (see FIG. 20)) of the image forming apparatus, for example, may be subject to a larger load due to a print instruction from an external device such as a personal computer and/or reception of a facsimile message. In such a case the image forming apparatus may delay in image processing to the image read by the image reader 81 and transmitting a reading signal. Thus, the document feeder cannot receive a reading signal at the time when the registration sensor 21 detects the leading end of the following document. In this case the document feeder temporarily stops feeding the document, and stops ejecting the preceding document to the ejection unit 14. However, this stop period is relatively short, therefore, the document feeder resumes feeding the document before the air between the preceding document and the previously ejected document to the ejection unit 14 is completely released to cause the preceding document to closely contact the ejected document. Thus, the ejection failures as described above are unlikely to occur.

Figure 6:
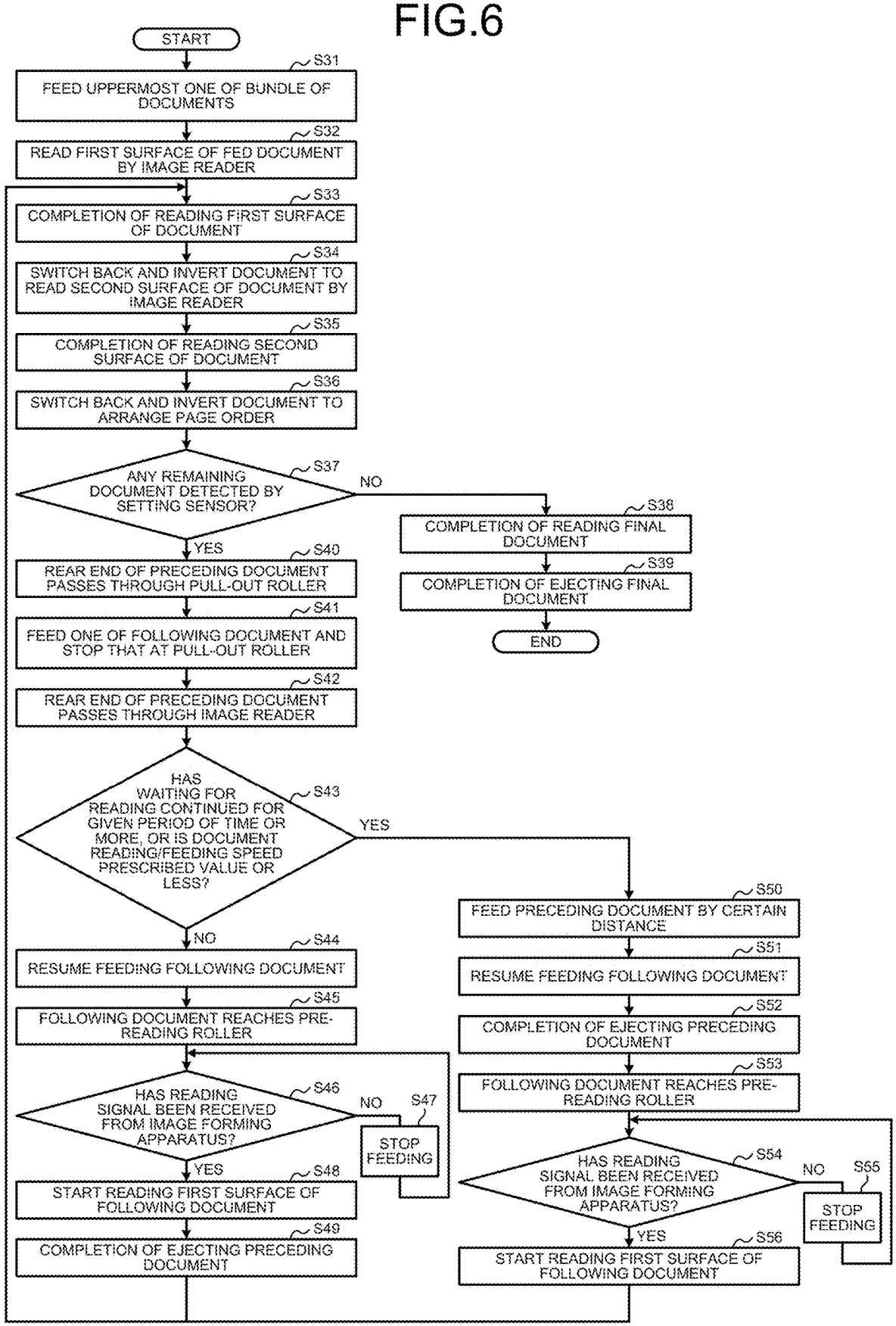
FIG. 6 is an operation flowchart of a double-side mode according to the present embodiment.

FIG. 6 is an operation flowchart of the double-side mode according to the present embodiment. As in the single-side mode, after reading the first surface of the document (S31 to S33), the document feeder feeds the document to the first feeding path 31 again through the third feeding path 33 and the fourth feeding path 34 and subjects the document to switch-back inversion, and reads the second surface of the document (S34). After completion of reading the second surface of the document (S35), the document feeder feeds the document again through the third feeding path 33, the fourth feeding path 34, and the first feeding path 31, subjects the document to switch-back inversion to arrange page order, and ejects it to the ejection unit 14 (S36).

When the setting sensor 41 detects no bundle of documents on the document placement table 5 (NO at S37), the document feeder determines the document being fed as the final document, and completes reading the final document (S38). After ejection of the final document to the ejection unit 14 (S39), the processing ends.

When the setting sensor 41 detects a bundle of documents on the document placement table 5 (YES at S37), the document feeder feeds the following document after the rear end of the preceding document passes through the pull-out roller pair 10 (S40), as in the single-side mode. Specifically, the document feeder feeds the following document from the document placement table 5, subjects the following document to skew correction and temporarily stops the document at the pull-out roller pair 10, and determines whether to delay feeding the following document at the timing when the rear end of the preceding document passes through the reading position E (S41 to S43). If waiting for reading may continue for a given period of time or more or if the document reading/feeding speed is equal to or lower than the prescribed value and failure in ejection of the preceding document may occur (YES at S43), the document feeder delays the feeding start timing from the pull-out roller pair 10 so that the following document reaches the pre-reading roller pair 11 at the registration position after the preceding document is ejected to the ejection unit 14 (S50 to S53). Having received a reading signal from the image forming apparatus at the time when the following document reaches the registration position, the document feeder feeds the following document to the image reading position at the document reading/feeding speed to read the first surface of the following document (YES at S54, and S56). Having received no reading signal from the image forming apparatus, the document feeder temporarily stops the following document at the registration position (NO at S54, and S55).

Meanwhile, if no waiting for reading for a given period of time or more occurs or if the document reading/feeding speed exceeds the prescribed value and failure in ejection of the preceding document is unlikely to occur (NO at S43), the document feeder feeds the following document without delaying the feeding start timing from the pull-out roller pair 10 (S44). Having received a reading signal from the image forming apparatus (YES at S46) at the time when the leading end of the following document reaches the pre-reading roller pair 11 (S45), the document feeder feeds the following document to the reading position at the document reading/feeding speed to start reading the first surface of the following document (S48). Meanwhile, having received no reading signal from the image forming apparatus (NO at S46), the document feeder temporarily stops feeding the following document at the registration position (the nip of the pre-reading roller pair 11) until receiving a reading signal (S47). Ejection of the preceding document to the ejection unit 14 is completed at given timing after start reading of the following document (after the leading end of the following document reaches the reading position) (S49).

As described above, in the image forming apparatus in which waiting for reading of the first surface of the following document in the double-side mode may continue for a given period of time or more, the automatic document feeder 2 feeds the documents such that the following document reaches the pre-reading roller pair 11 after the preceding document is ejected. Thus, a temporary feeding stop for a given period of time due to waiting for reading the first surface of the following document does not affect ejection of the preceding document. This can prevent occurrence of ejection failure, such as ejection of an undulated rear side of the preceding document to the ejection unit 14, a fall of the document from the ejection unit 14, and the rear end of the preceding document remaining on the ejection roller pair 13.

In reading the second surface of the document, waiting for reading may continue for a given period of time or more, causing temporarily stop of feeding the document for the given period of time or more. In this case, however, there is no document being ejected, start of feeding the document from the pull-out roller pair 10 is not to be delayed.

In addition, in the image forming apparatus with low productivity and the document reading/feeding speed set to a lower speed, the automatic document feeder 2 feeds documents such that the following document reaches the pre-reading roller pair 11 after ejection of the preceding document. Because of this, the preceding document can be ejected at a speed higher than the document reading/feeding speed. This makes it possible to quickly feed the rear end of the preceding document to the ejection unit 14, and prevent the rear end of the preceding document from remaining on the ejection roller pair 13.

With no occurrence of waiting for reading for a given period of time or more, or if failure in ejection of the preceding document is unlikely to occur since the document reading/feeding speed exceeds the prescribed value, the document feeder feeds the following document without delay in feeding start timing. Thereby, a decline in productivity can be avoided.

The document reading/feeding speed is set in accordance with the productivity of the image forming apparatus to incorporate the automatic document feeder 2, and the feeding start timing of the following document from the pull-out roller pair 10 is set at the time of factory shipment and/or during assembly of the automatic document feeder 2 in the image forming apparatus in a user's location.

In addition, in an image forming apparatus including a low-speed mode and a high-speed mode, the automatic document feeder 2 to mount may be changed in document reading/feeding speed in accordance with the mode of the image forming apparatus to change productivity. In such a case, in the low-speed mode of the image forming apparatus, the document reading/feeding speed may decrease to a prescribed value or less. In such a device, the document feeder sets the feeding start timing of the following document from the pull-out roller pair 10 in accordance with the mode of the image forming apparatus.

Depending on image forming apparatuses, no waiting for writing to the memory occurs in the printing process as long as the number of document sheets is equal to or smaller than a given number. The automatic document feeder 2 incorporated in such an image forming apparatus may delay start timing of feeding document sheets to the pre-reading roller pair 11 if the number of the sheets exceeds the given number.

The following will describe modifications of the present embodiment.

First Modification

Figure 7:
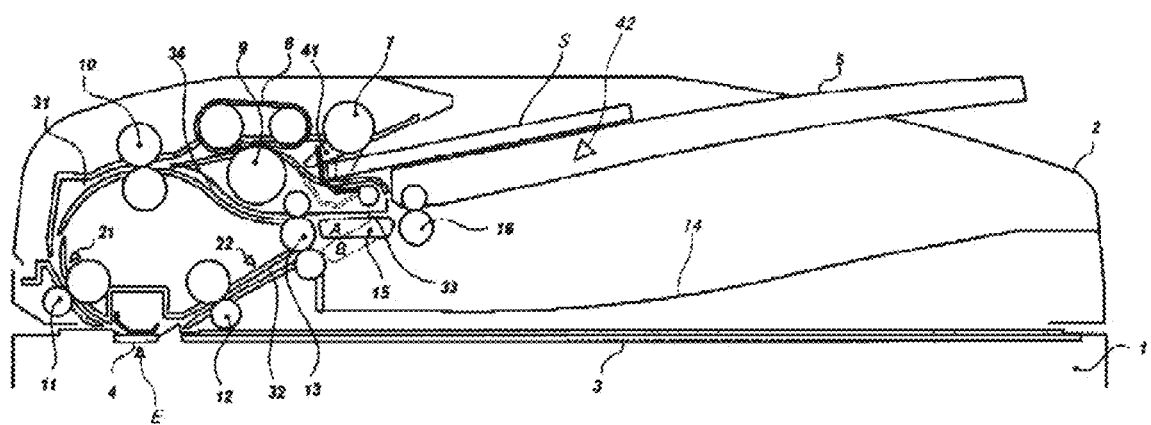
FIG. 7 is a schematic configuration diagram of the automatic document feeder according to a first modification.

FIG. 7 is a schematic configuration diagram of an automatic document feeder according to a first modification. As illustrated in FIG. 7, the automatic document feeder according to the first modification includes, the document placement table 5, a length sensor 42 that detects the length of the document in the feeding direction. The length sensor 42 determines whether the length is equal to or longer than a prescribed value. The length sensor 42 detects the length of the document being equal to or longer than the prescribed value, or less than the prescribed value, when set on the document placement table 5.

In the case of the documents having a length smaller than the prescribed value in the feeding direction, the preceding document does not tightly contact the document set on the ejection unit 14 or their contact surface is small if the document feeder temporarily stops feeding during ejection of the preceding document due to waiting for reading of the following document. Because of this, no ejection failure described above occurs at the time of resuming feeding, so that the document feeder can properly eject the preceding document to the ejection unit 14. Meanwhile, in the case of the documents having a length equal to or larger than the prescribed value in the feeding direction, the preceding document tightly contacts the document set on the ejection unit 14 or their contact surface is large if the document feeder temporarily stops feeding during ejection of the preceding document due to waiting for reading of the following document. Because of this, the ejection failures described above may occur at the time of resuming feeding. In view of this, in the first modification, regarding the documents having a length less than the prescribed value in the feeding direction, the document feeder refrains from delaying the feeding start timing to the registration position (pre-reading roller pair 11), and delays the timing for the documents having a length equal to or larger than the prescribed value.

Figure 8:
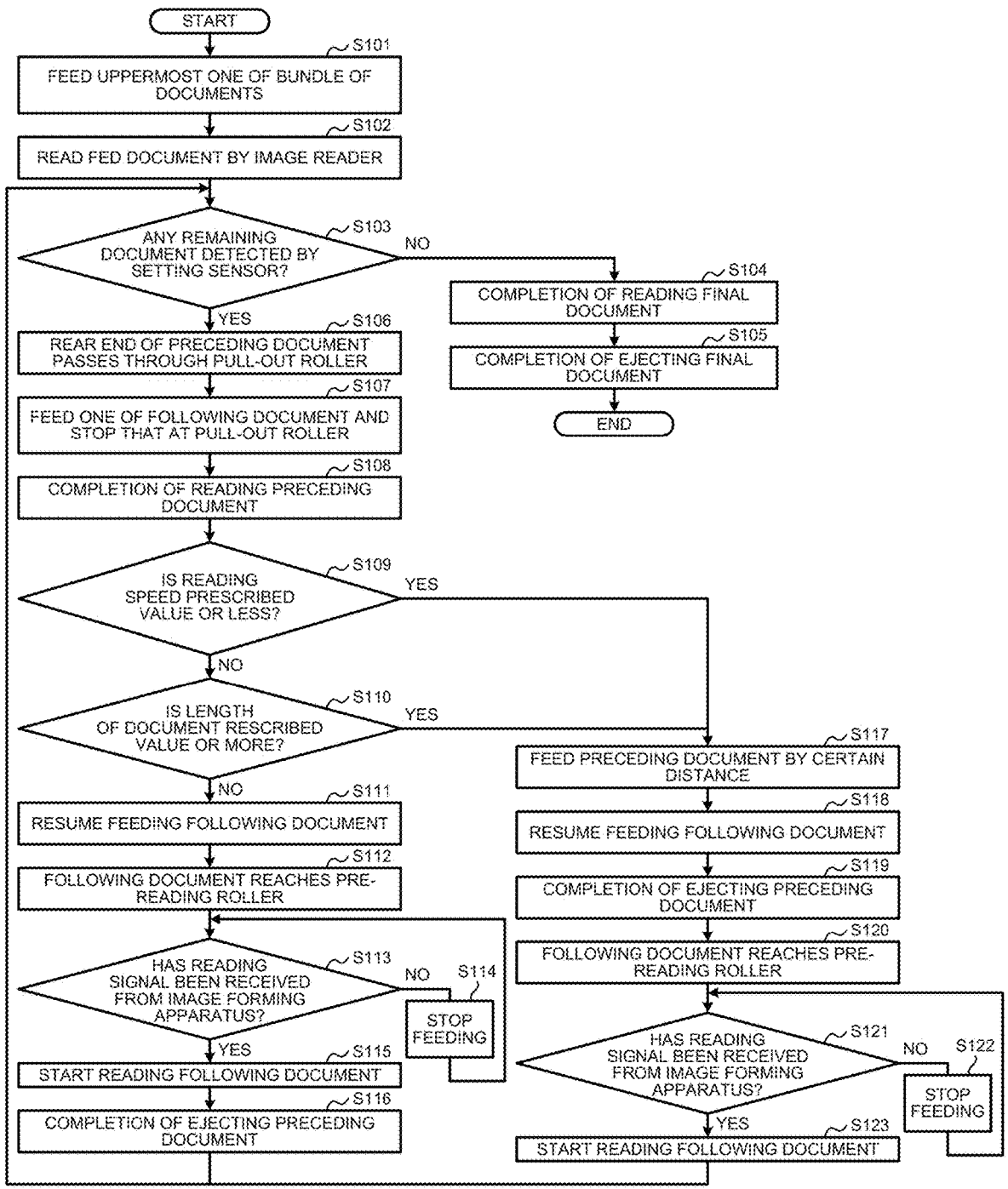
FIG. 8 is an operation flowchart of the single-side mode in the first modification.
Figure 9:
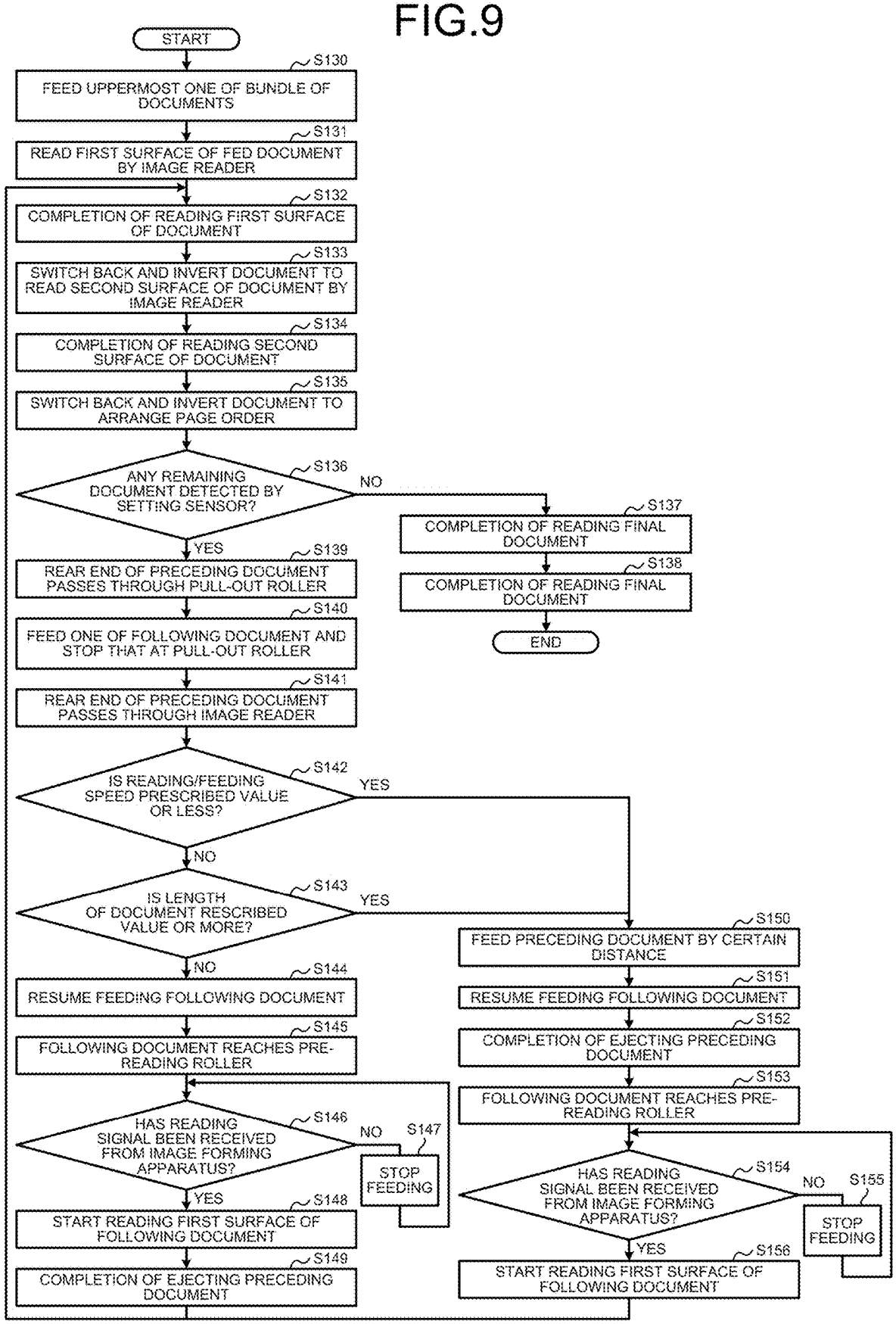
FIG. 9 is an operation flowchart of the double-side mode in the first modification.

FIG. 8 is an operation flowchart of the single-side mode in the first modification, and FIG. 9 is an operation flowchart of the double-side mode in the first modification. Referring to FIG. 8 and FIG. 9, an explanation of the same operations as those in the embodiment will be omitted.

In the single-side mode of the first modification, as illustrated in FIG. 8, the document feeder determines whether to delay feeding the following document after temporarily stopping the following document at the pull-out roller pair 10, and completes reading the preceding document the rear end of which has passed through the reading position E. Specifically, at the document reading/feeding speed lower than the prescribed value (YES at S109), the rear end of the preceding document remains on the ejection roller pair 13, therefore, the document feeder resumes feeding the following document with a delay by a given period of time (S117 to S123), as in the embodiment.

When the length sensor 42 detects the document having a length equal to or larger than the prescribed value (YES at S110), the document feeder delays feeding for a given period of time and resumes feeding the following document (S117 to S123).

In the case of the documents having a length equal to or larger than the prescribed value, the preceding document tightly contacts with a large area of the document set on the ejection unit 14 when the following document reaches the pre-reading roller pair 11 and ejection of the preceding document to the ejection unit 14 is temporarily stopped. Thus, the document feeder resumes feeding while the ejected part of the preceding document tightly contacts with the document set on the ejection unit 14. This makes it difficult for the contact part between the preceding document and the document set on the ejection unit 14 to move, which is likely to cause ejection failure, such as undulation of the rear side, rear end remaining, and falling of the document from the ejection unit 14. Thus, for the documents having a length equal to or larger than the prescribed value, the document feeder delays the feeding start timing of the following document to allow the following document to reach the pre-reading roller pair 11 after the preceding document is ejected, thereby preventing a temporary stop of feeding the preceding document being ejected. This can avoid temporary stop of the preceding document during ejection, and prevent occurrence of ejection failure.

Meanwhile, at the document reading/feeding speed exceeding the prescribed value (NO at S109), the document feeder can quickly eject the preceding document. Thus, the document feeder feeds the following document to the pre-reading roller pair 11 immediately after completion of reading the preceding document (S111 to S116).

In the case of the documents having a length smaller than the prescribed value in the feeding direction, the preceding document contacts a small area of the document set on the ejection unit 14 or does not contact the document when the following document reaches the pre-reading roller pair 11 and ejection of the preceding document to the ejection unit 14 is temporarily stopped. In this case, thus, the document feeder can resume ejecting after waiting for a given period of time to allow the preceding document to smoothly slide on the document of the ejection unit 14 for proper ejection. That is, in the case of the documents having a length smaller than the prescribed value in the feeding direction, the document feeder feeds the following document to the pre-reading roller pair 11 immediately after completion of reading the preceding document (S111 to S116).

As described above, at the document reading/feeding speed exceeding the prescribed value or as to the documents having a length smaller than the prescribed value in the feeding direction, the document feeder can prevent decrease in productivity by feeding the documents without delay in the feeding start timing of the following document to the pre-reading roller pair 11.

As illustrated in FIG. 9, in the double-side mode of the first modification, after the rear end of the preceding document passes through the reading position E (S141), the document feeder determines whether to delay feeding of the following document, as in the single-side mode illustrated in FIG. 8. Specifically, at the document reading/feeding speed below the prescribed value (YES at S142), the rear end of the preceding document remains on the ejection roller pair 13, so that the document feeder resumes feeding the following document with a delay by a given period of time (S150 to S156), as in the embodiment.

When the length sensor 42 detects the documents having a length equal to or larger than the prescribed value (YES at S143), ejection failure, such as undulation of the rear side, rear end remaining, and falling of the document from the ejection unit 14, may occur in the preceding document, therefore, the document feeder resumes feeding the following document with a delay by a given period of time (S150 to S156).

Meanwhile, at the document reading/feeding speed exceeding the prescribed value and as to the documents having a length smaller than the prescribed value in the feeding direction (NO at S142 and NO at S143), the document feeder feeds the following document to the pre-reading roller pair 11 immediately after the rear end of the preceding document passes through the reading position (S144 to S149).

In the image forming apparatus in which a reading waiting period equal to or larger than the prescribed value may occur, the automatic document feeder may delay the feeding start timing of the following document to the pre-reading roller pair 11 when the length sensor 42 detects the documents having a length equal to or larger than the prescribed value. Thereby, the automatic document feeder does not delay feeding of the document having the length of the prescribed value or more, detected by the length sensor 42, to the pre-reading roller pair 11, unless incorporated in the image forming apparatus in which a reading waiting may continue for a period equal to or larger than the prescribed value. This can prevent reduction in productivity. Meanwhile, in the image forming apparatus including the HDD that stores an image read by the image reader 81, causing no waiting for reading due to waiting for write to the memory, waiting for reading may still continue for a given period of time or more due to an unexpected factor. For this reason, regardless of the structure of the image forming apparatus to incorporate the automatic document feeder, the automatic document feeder may delay the feeding start timing of the following document having a length equal to or larger than the prescribed value, thereby advantageously ensuring prevention of ejection failure.

Second Modification

Figure 10:
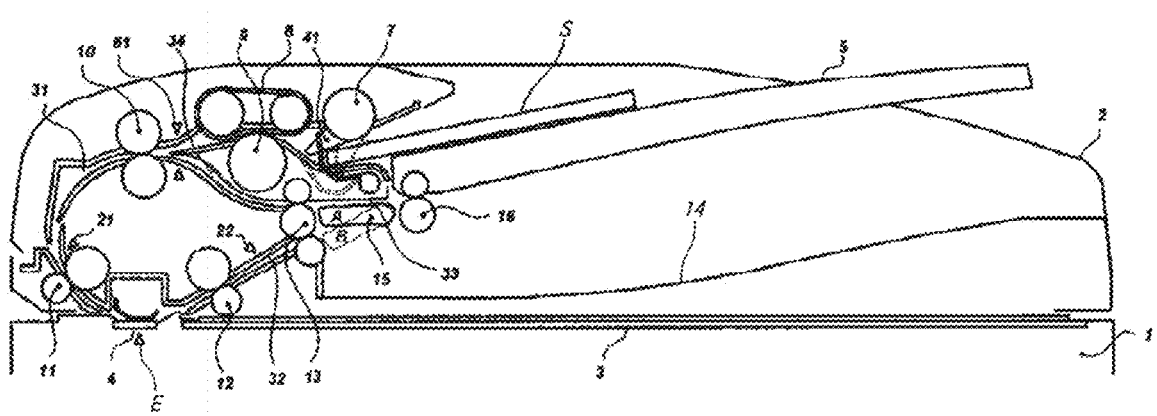
FIG. 10 is a schematic configuration diagram of the automatic document feeder according to a second modification.

FIG. 10 is a schematic configuration diagram of an automatic document feeder according to a second modification. The automatic document feeder according to the second modification includes a thickness sensor 61 that detects the thickness of the document between the paper feeding belt 8 and the pull-out roller pair 10. The thickness sensor 61 can be preferably an ultrasonic sensor. An ultrasonic sensor can detect anomaly in fed documents if overlapped through the separation unit.

The documents having a thickness equal to or larger than a prescribed value, that is, a thick thickness, exhibit great strength. Using such documents, by tight contact with the document set on the ejection unit 14 due to a temporary stop of feeding for a given period of time or more due to waiting for reading of the following document, the preceding document is not bent at the time of resuming feeding, and the contact part is properly applied with feeding force. As a result, the preceding document can be properly ejected while sliding on the document ejected to the ejection unit 14.

Meanwhile, the documents having a thickness smaller than the prescribed value, that is, a thin thickness, has lower strength. Using such documents, by tight contact with the document set on the ejection unit 14 due to a temporary stop of feeding for a given period of time or more due to waiting for reading of the following document, the preceding document is bent at the time of resuming feeding, and the contact part is not properly applied with feeding force. As a result, the preceding document cannot slide on the document ejected to the ejection unit 14, therefore, cannot be properly ejected.

In view of this, in the second modification, the document feeder delays the feeding start timing of the document having a thickness smaller than the prescribed value to the registration position (pre-reading roller pair 11), and refrains from delaying the feeding start timing of the document having a thickness of the prescribed value or more to the registration position (pre-reading roller pair 11).

Figure 11:
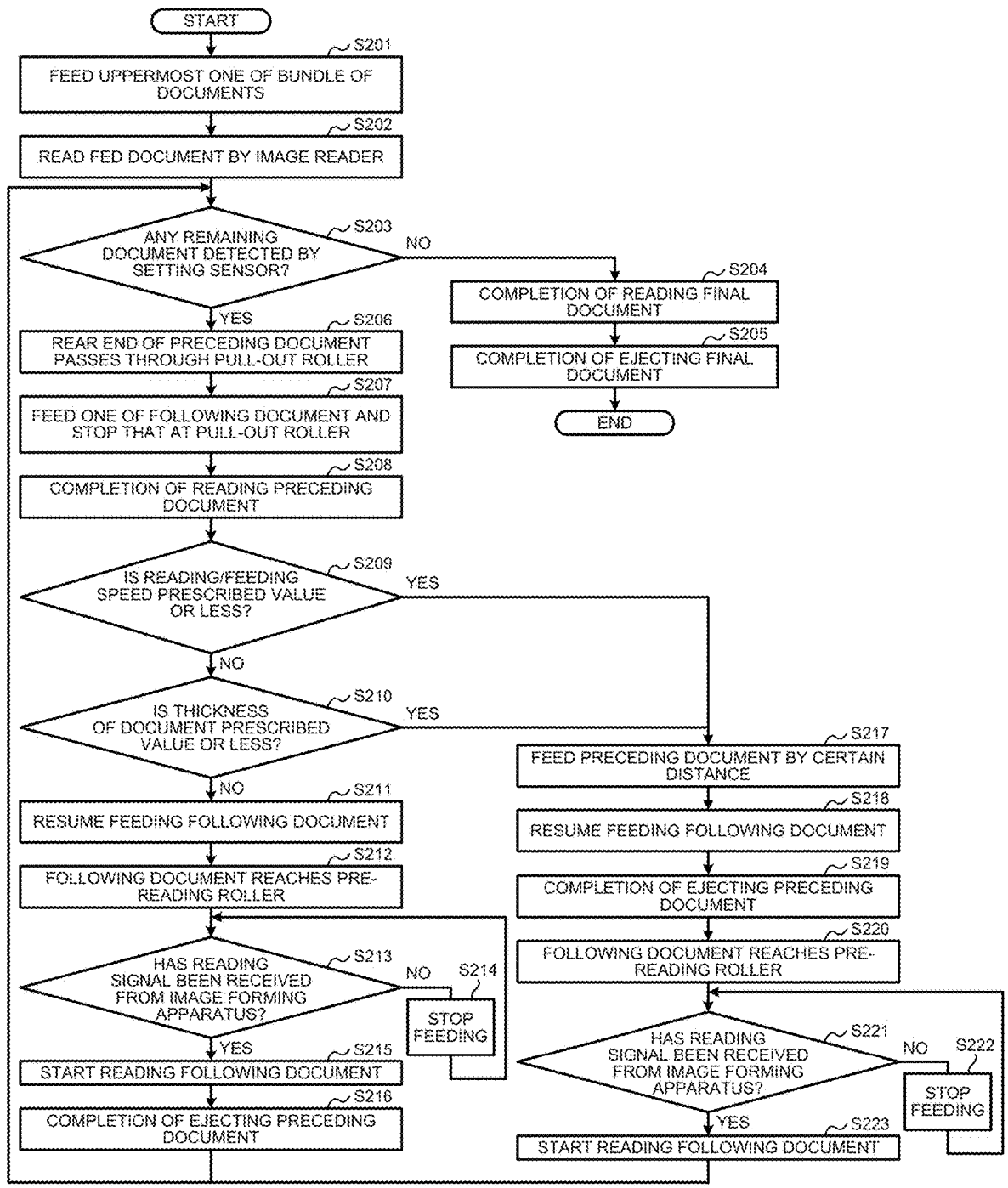
FIG. 11 is an operation flowchart of the single-side mode in the second modification.
Figure 12:
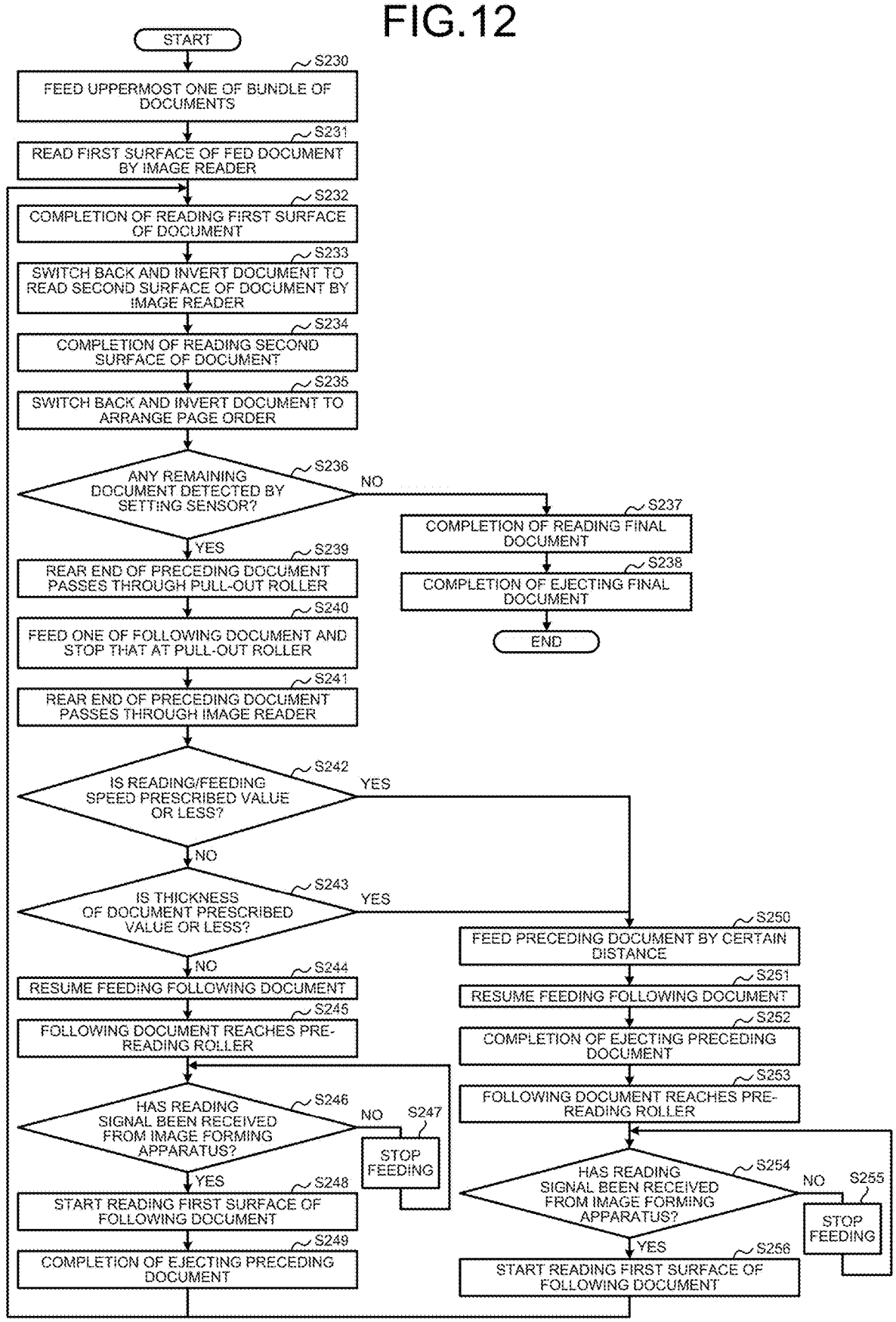
FIG. 12 is an operation flowchart of the double-side mode in the second modification.

FIG. 11 is an operation flowchart of the single-side mode in the second modification, and FIG. 12 is an operation flowchart of the double-side mode in the second modification. In FIG. 11 and FIG. 12, an explanation of the same operations as those in the embodiment will be omitted.

In the single-side mode of the second modification, as illustrated in FIG. 11, after completion of reading the preceding document the rear end of which has passed through the reading position E, the document feeder determines whether to delay feeding of the following document, as follows. Specifically, at the document reading/feeding speed below the prescribed value (YES at S209), since the rear end of the preceding document remains on the ejection roller pair 13, the document feeder delays feeding for a given period of time and thereafter resumes feeding the following document (S217 to S223), as in the embodiment.

When the thickness sensor 61 detects the document having a thickness equal to or smaller than the prescribed value (YES at S210), the document feeder delays feeding for a given period of time and thereafter resumes feeding the following document (S217 to S223). In the present modification, the document feeder delays feeding of the following document for a given period of time, for the documents with a thickness of basis weight 40 [g/m$^2$] or less.

The documents having a thickness equal to or smaller than the prescribed value are lower in strength and are therefore easily bendable. For this reason, at the time of resuming feeding, the rear side of the preceding document is likely to undulate while the leading end tightly contacts with the document ejected to the ejection unit 14. Further, the document is ejected in a bent state, so that restoring force acts on the rear side reversely to the feeding direction, to return the rear end of the document when ejected from the ejection roller pair 13. This may cause ejection failure such as the rear end remaining on the ejection roller pair 13, paper jam due to slip of the preceding document with respect to the ejection roller pair 13 by restoring force. Thus, as to the documents having a thickness of the prescribed value or less, the document feeder delays the feeding start timing of the following document such that the following document reaches the pre-reading roller pair 11 after the preceding document is ejected. Thereby, the document feeder does not temporarily stop feeding the preceding document being ejected for a given period. This can avoid temporary stop of the preceding document during ejection, and prevent occurrence of ejection failure.

Meanwhile, at the image reading/feeding speed exceeding the prescribed value and for the documents having the thickness exceeding the prescribed value (NO at S209 and YES at S210), the document feeder feeds the following document to the pre-reading roller pair 11 immediately after completion of reading the preceding document (S211 to S216).

As described above, as to the document having the thickness exceeding the prescribed value, the preceding document may tightly contact with the document set on the ejection unit 14 due to temporary stop of feeding for a given period of time or more, waiting for reading of the following document. However, the preceding document is not bent at the time of resuming feeding, and smoothly moves on the document on the ejection unit 14. Thus, the ejection failures described above are unlikely to occur. That is, in the case of the documents with the thickness exceeding the prescribed value, the document feeder feeds the following document to the pre-reading roller pair 11 immediately after completion of reading the preceding document (S211 to S216). Thereby, the document feeder can be prevented from lowering in productivity.

As illustrated in FIG. 12, in the double-side mode of the second modification, the document feeder determines whether to delay feeding of the following document after the rear end of the preceding document passes through the reading position E (S241), as in the single-side mode illustrated in FIG. 11. Specifically, at the document reading/feeding speed below the prescribed value (YES at S242), since the rear end of the preceding document remains on the ejection roller pair 13, the document feeder delays feeding by a given period of time and thereafter resumes feeding the following document (S250 to S256), as in the embodiment.

The thickness sensor 61's detection of the document having the thickness below the prescribed value (YES at S243) signifies that ejection failure may occur as described above, therefore, the document feeder delays feeding by a given period of time and thereafter resumes feeding the following document (S250 to S256).

Meanwhile, at the document reading/feeding speed exceeding the prescribed value and when the thickness of the document exceeds the prescribed value (NO at S242 and NO at S243), the document feeder feeds the following document to the pre-reading roller pair 11 immediately after the rear end of the preceding document passes through the reading position (S244 to S249).

In the image forming apparatus in which waiting for reading may continue for a given period of time or more, the automatic document feeder 2 may delay the feeding start timing of the following document to the pre-reading roller pair 11 for the documents having a thickness of the prescribed value or less. In this manner, the automatic document feeder 2 refrains from delaying feeding of the documents having a thickness of the prescribed value or less to the pre-reading roller pair 11 unless incorporated in the image forming apparatus in which waiting for reading may continue for a given period of time or more. Thus, the automatic document feeder 2 can be prevented from lowering in productivity.

As another example, as to the document having a thickness of the prescribed value or less, the automatic document feeder 2 may check the length of the document, and refrain from delaying the feeding start timing of the following document to the pre-reading roller pair 11 when the document having a length smaller than the prescribed value. Ejection failure of the document having a thickness of the prescribed value and a smaller length does not occur as described in the first modification. Thus, as to the document having the thickness of the prescribed value or less and a length less than the prescribed value, the document feeder delays the feeding start timing of the following document to the pre-reading roller pair 11. Thereby, the automatic document feeder 2 can be prevented from lowering in productivity and occurrence of ejection failure.

As for the documents having a thickness of the prescribed value or less and a length of the prescribed value or more, the document feeder may refrain from delaying the feeding start timing of the following document to the pre-reading roller pair 11, unless incorporated in the image forming apparatus in which a reading waiting may continue for a period equal to or larger than the prescribed value. Thereby, the automatic document feeder 2 can be further prevented from lowering in productivity.

Third Modification

Figure 13:
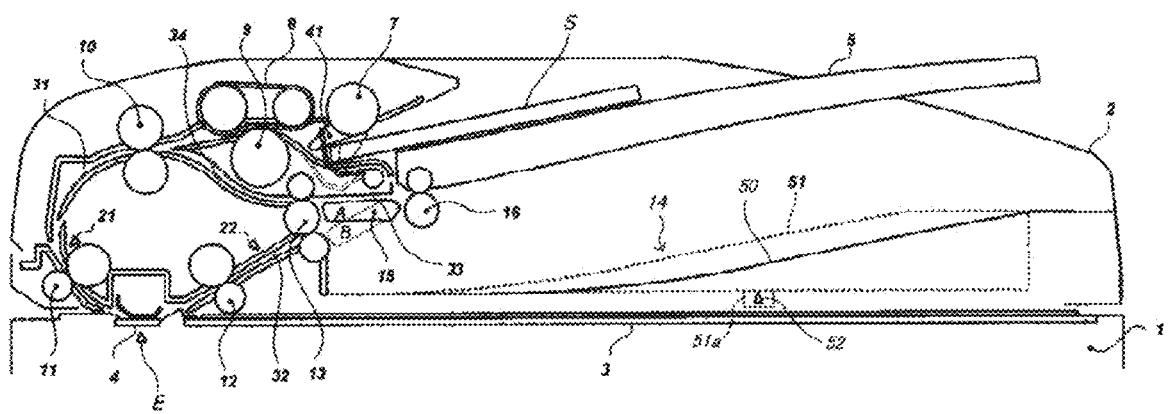
FIG. 13 is a schematic configuration diagram of the automatic document feeder according to a third modification.
Figure 14A:
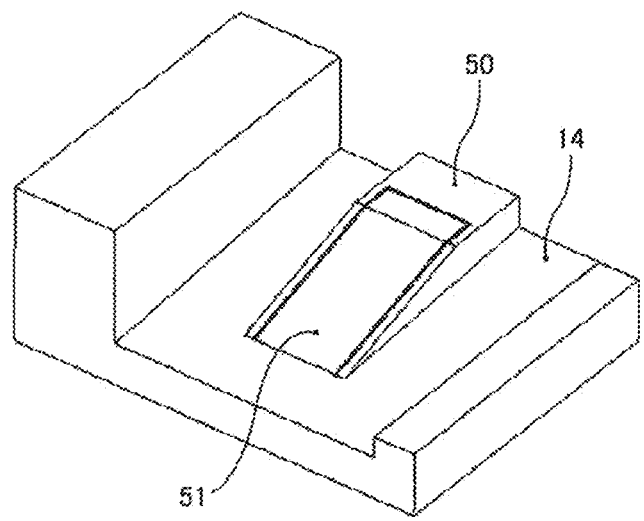
FIGS. 14A and 14B are perspective views illustrating an ejection unit of the automatic document feeder according to the third modification.
Figure 14B:
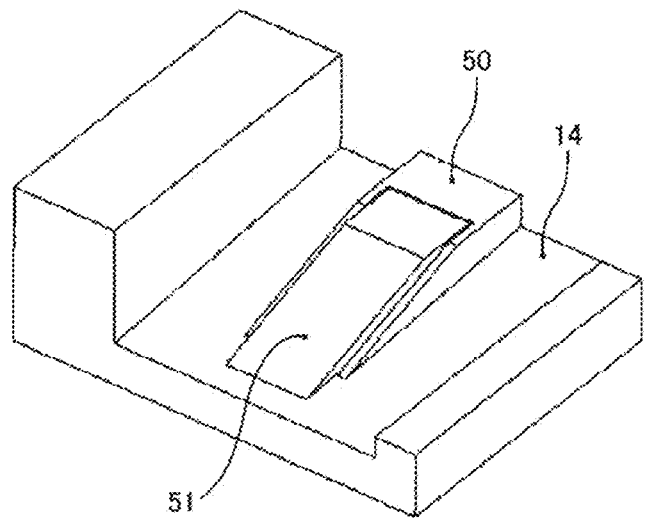

FIG. 13 is a schematic configuration diagram of an automatic document feeder according to a third modification, and FIGS. 14A and 14B are perspective views illustrating an ejection unit 14 of the automatic document feeder according to the third modification.

The automatic document feeder of the third modification includes the ejection unit 14 provided with a buckling preventing member 51 serving as a projection member. A projection 50 serving as a projection member projects from the sheet placement surface of the ejection unit 14 such that the central part between the restrictive surfaces of the ejection unit 14 along the width of the document abuts against the center of the width of the maximum feedable sheet. The buckling preventing member 51 serving as the projection member is slidably included in the projection 50 in the feeding direction such that the central part between the restrictive surfaces of the ejection unit 14 along the width of the document abuts against the width center of the maximum feedable sheet. The buckling preventing member 51 may project from the sheet placement surface of the ejection unit 14. Specifically, as illustrated in FIG. 14A, the buckling preventing member 51 is slidable between a contained position where it is contained in the projection 50 and a given operating position where the buckling preventing member 51 is pulled out from the projection 50 toward upstream in the feeding direction, as illustrated in FIG. 14B and indicated by the broken line in FIG. 13.

When ejected from the ejection roller pair 13, the leading end of the document may hang downward and be curled by its own weight, and the leading end may contact the placement surface of the ejection unit 14. While further fed from of the ejection roller pair 13, the leading end of the document may be curled up and buckled, that is, bent such that the central part is located more downstream than the leading end in the feeding direction.

The projection 50 works to contact the central part of the width of the ejected document with the leading end hanging down and curled. Meanwhile, both sides of the width of the document are located below the projection 50 and not in contact with the projection 50. As a result, the leading end of the document is curved along the width. The curved document along the width increases in strength against the bending in the feeding direction. This can prevent the leading end of the document from being curled up when ejected to the ejection unit 14 (bent such that the central part is located more downstream than the leading end in the feeding direction).

The ejection unit 14 is located directly under the document placement table 5, and the switching tab 15 and the inversion roller pair 16 are disposed above the ejection unit upstream in the feeding direction. Thus, only a vertically narrow space remains on the upstream side of the ejection unit in the feeding direction. For this reason, the projection 50 extending to the upstream end of the ejection unit in the feeding direction will further narrow the vertical space, decreasing the stacking capacity of the ejection unit 14. Because of this, the projection 50 is apart from the upstream end of the ejection unit in the feeding direction to a certain degree.

However, the document of a thin thickness has low strength, so that the leading end of the document contacts the placement surface of the ejection unit before the projection 50. The document cannot thus increase in strength against the bending in the feeding direction, when ejected, and may buckle. For this reason, in the third modification, the buckling preventing member 51 is provided. For the document being thin paper, the buckling preventing member 51 is pulled out to the operating position to form a projection in the center of the width of the ejection unit upstream in the feeding direction, as illustrated in FIG. 14B. Thereby, the buckling preventing member 51 contacts only the central part of the width of the leading end of the ejected document of a thin thickness, thereby curving the leading end of the document along the width. This can prevent the leading end of the thin paper from buckling. Meanwhile, for the documents other than thin paper, the buckling preventing member 51 is contained in the projection 50 as illustrated in FIG. 14A. This can increase the vertical space upstream of the ejection unit 14 in the feeding direction, and prevents decrease in stacking capacity of the ejection unit 14.

For the document being thin paper, since the buckling preventing member 51 is pulled out to the operating position, the position of the buckling preventing member 51 may be detected as the thickness of the document. As illustrated in FIG. 13, the buckling preventing member 51 is provided with a detection part 51a, and the ejection unit 14 is provided with a position sensor 52 being an optical sensor that senses the detection part 51a. As illustrated in FIG. 13, in the operating position of the buckling preventing member 51, while the document being thin paper is set on the document placement table 5, the position sensor 52 opposes the detection part 51a to detect the buckling preventing member 51 in the operating position. As described above, while the document being thin paper is set on the document placement table 5, the buckling preventing member 51 is located in the operating position. The position sensor 52 senses the buckling preventing member 51 in the operating position to thereby determine that the document to feed is thin paper of a thin thickness. While the document being thick paper is set on the document placement table 5, the buckling preventing member 51 is located in the contained position, that is, downstream in the feeding direction or rightward in FIG. 13. In this state, the detection part 51a is located on the right side of the position sensor 52 in the drawing, and does not oppose the position sensor 52. Thus, the position sensor 52 does not detect the detection part 51a, and detects the buckling preventing member 51 in the contained position. As described above, while the document being thick paper is set on the document placement table 5, the buckling preventing member 51 is located in the contained position, and the position sensor 52 senses the buckling preventing member 51 in the contained position to be able to determine that the document to feed is thick paper.

Figure 15:
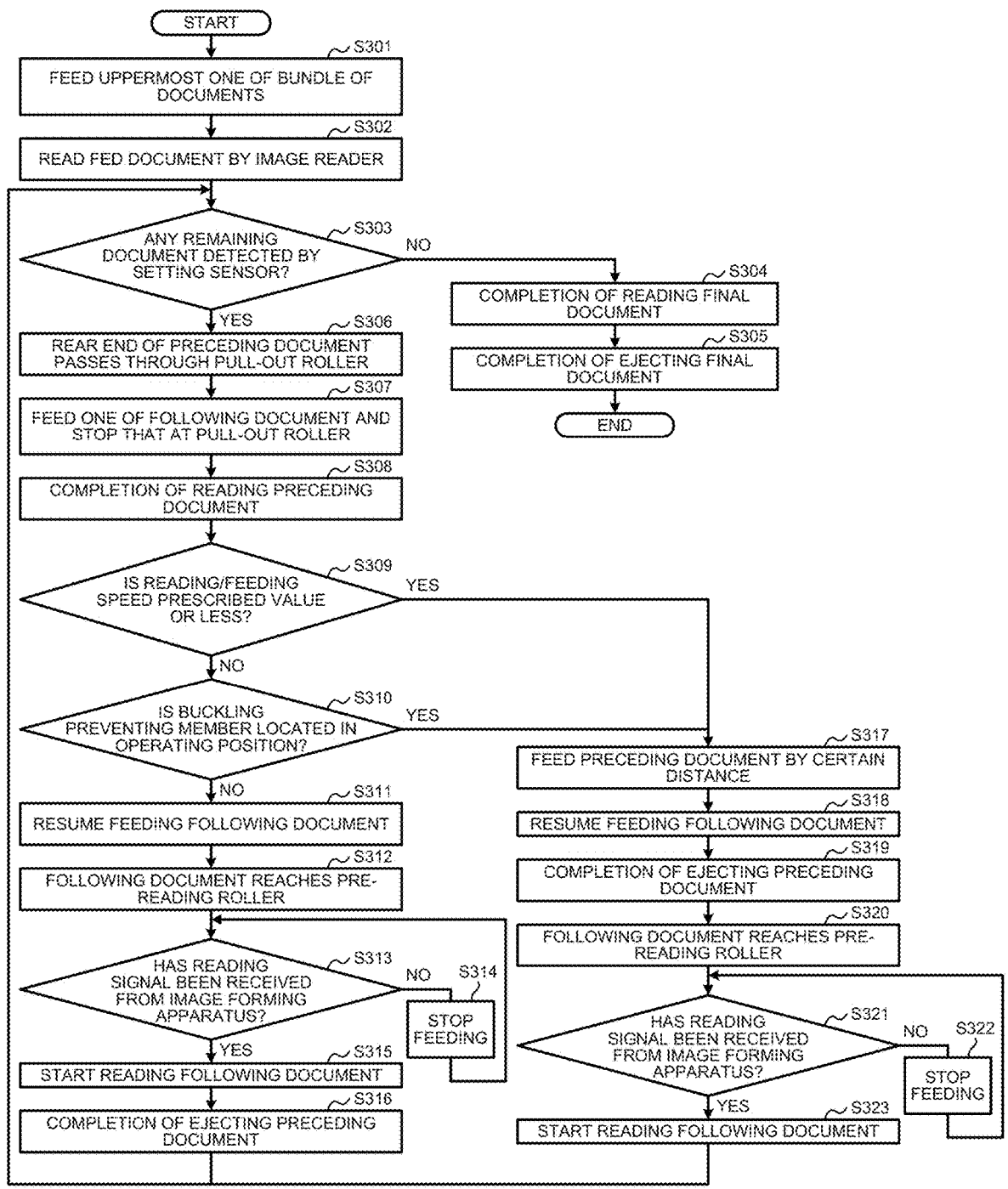
FIG. 15 is an operation flowchart of the single-side mode when determining whether thickness of the fed document is equal to or larger than a prescribed value on the basis of the position of a buckling preventing member.
Figure 16:
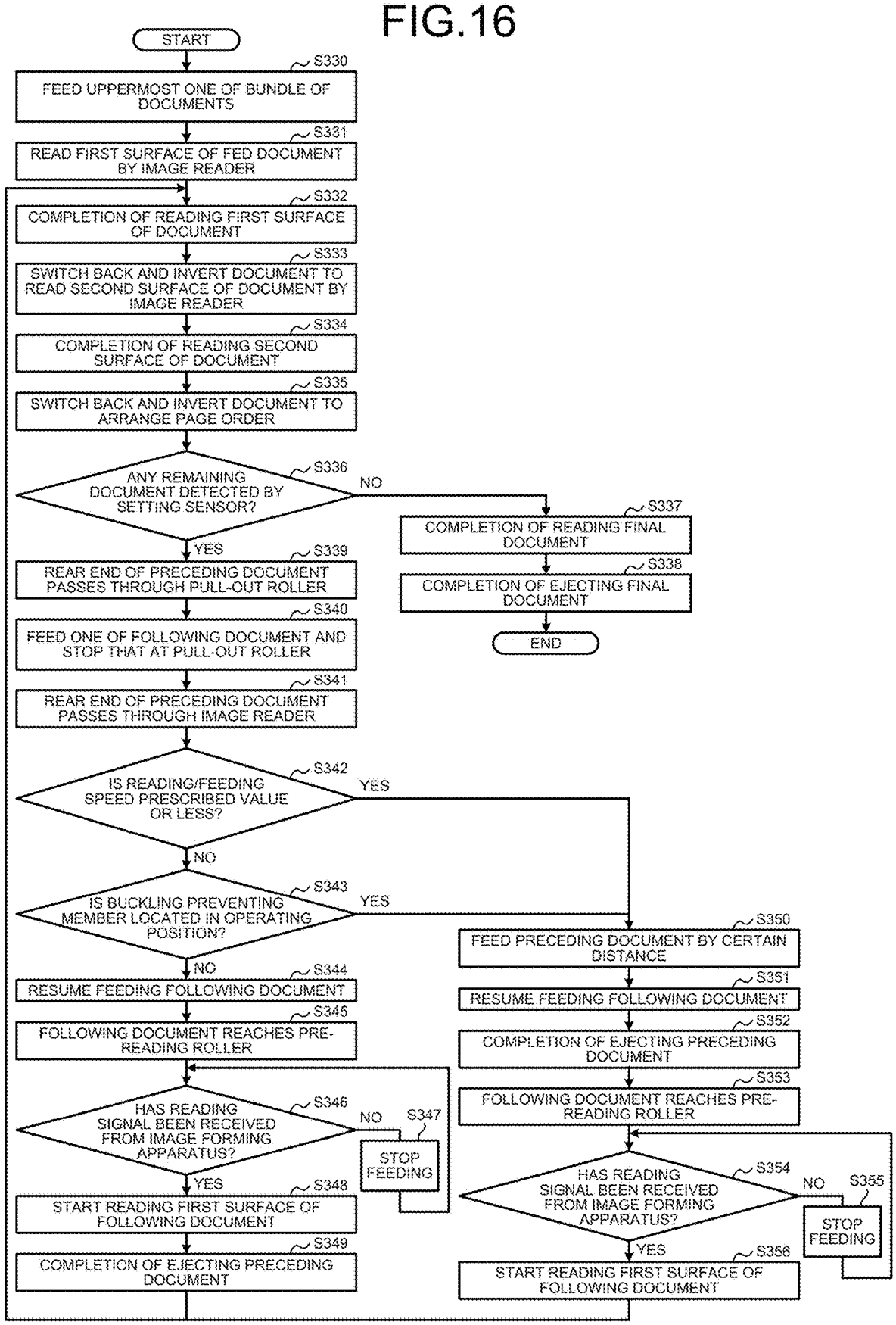
FIG. 16 is an operation flowchart of the double-side mode when determining whether thickness of the fed document is equal to or larger than the prescribed value on the basis of the position of the buckling preventing member.

FIG. 15 is an operation flowchart of the single-side mode in the case of determining the thickness of the document to feed from the position of the buckling preventing member 51. FIG. 16 is an operation flowchart of the double-side mode in the case of determining the thickness of the document to feed the position of the buckling preventing member 51. In the flowcharts, an explanation of the operations as those in the embodiment will be omitted when appropriate.

As illustrated in FIG. 15, in the single-side mode, the automatic document feeder 2 determines whether to delay feeding the following document after completion of reading the preceding document (S308), and delays feeding by a given period of time when the document reading/feeding speed is below the prescribed value (YES at S309), and resumes feeding the following document (S317 to S323), as in the above modification.

In the image forming apparatus in which waiting for reading may continue for a given period of time or more, after determining that a thin-paper document is set on the document placement table 5 from the operating position of the buckling preventing member 51 (YES at S310), the automatic document feeder 2 delays feeding by the given period of time, and thereafter resumes feeding the following document (S317 to S323).

Meanwhile, after determining from the contained position of the buckling preventing member 51 that a thick-paper document is set on the document placement table 5 (NO at S310), the automatic document feeder 2 immediately feeds the following document to the pre-reading roller pair 11 after completion of reading the preceding document (S311 to S316).

Likewise, in the double-side mode of the image forming apparatus in which waiting for reading may continue for a given period of time or more, as illustrated in FIG. 16, the document feeder 2 determines whether to delay feeding the following document after the rear end of the preceding document passes through the reading position E. After determining from the operating position of the buckling preventing member 51 that a thin-paper document is set on the document placement table 5 (YES at S343), the document feeder 2 delays feeding for the given period of time, and thereafter resumes feeding the following document (S350 to S356).

After determining from the contained position of the buckling preventing member 51 that a thick-paper document is set on the document placement table 5 (NO at S343), the document feeder 2 immediately feeds the following document to the pre-reading roller pair 11 after completion of reading the preceding document (S344 to S349).

Figure 17:
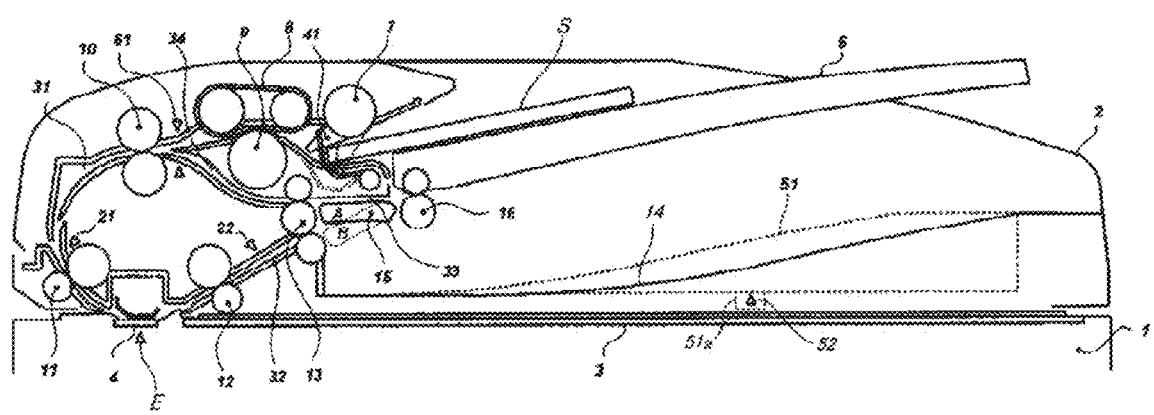
FIG. 17 is a schematic configuration diagram of the automatic document feeder including a thickness sensor according to the third modification.

With respect to the thickness of the document, as illustrated in FIG. 17, a thickness sensor 61 is disposed between the paper feeding belt 8 and the pull-out roller pair 10, to detect the thickness of the document. The document feeder determines that the document is thick paper when the thickness exceeds the prescribed value, and determines that the document is thin paper when the thickness is equal to or smaller than the prescribed value. At the time when the thickness of the document to feed detected by the thickness sensor 61 is the prescribed value or less, and the position sensor 52 has not detected the detection part 51a so that the buckling preventing member 51 is not located in the operating position, the operation panel 101 (see FIG. 20) that displays the operation of the image forming apparatus displays an instruction to place the buckling preventing member 51 in the operating position.

Figure 18:
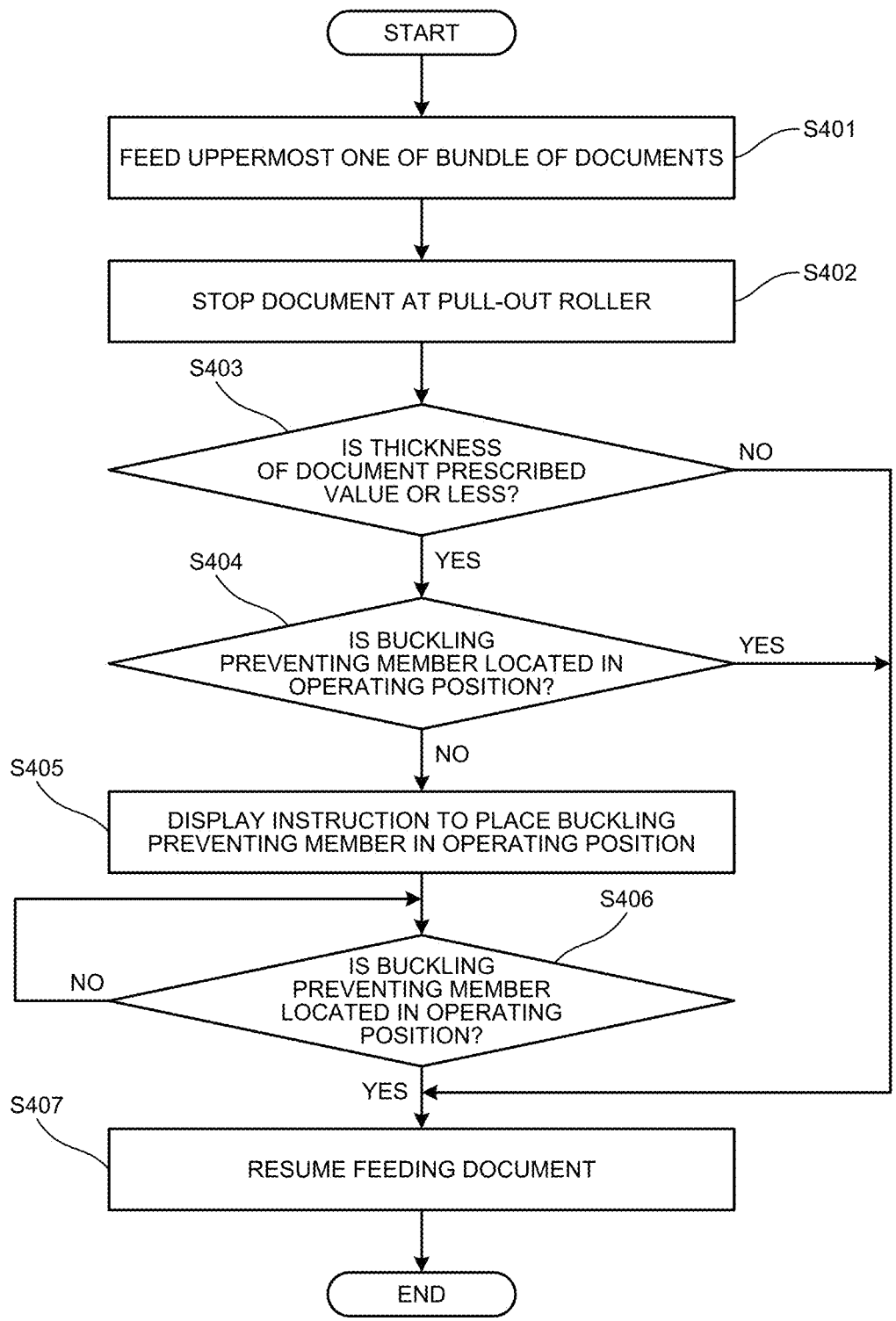
FIG. 18 is a control flowchart to position the buckling preventing member in an operating position when the thickness of the fed document is equal to or smaller than the prescribed value.

FIG. 18 is a flowchart for controlling the buckling preventing member 51 to be placed in the operating position when the thickness of the document to feed is the prescribed value or less. The document feeder 2 feeds the uppermost sheet of documents on the document placement table 5 (S401) and temporarily stops the sheet at the pull-out roller pair 10 (S402). The thickness sensor 61 then senses the thickness of the document (S403). When the thickness of the document exceeds the prescribed value, the document feeder 2 resumes feeding the document (S407).

Meanwhile, when the document detected by the thickness sensor 61 is thin paper of a thickness of the prescribed value or less, the document feeder 2 determines whether the buckling preventing member 51 is located in the operating position (S404). The document feeder 2 determines from detection of the detection part 51a by the position sensor 52 that the buckling preventing member 51 is located in the operating position (YES at S404), and resumes feeding the document (S407).

If the position sensor 52 does not detect the detection part 51a and the buckling preventing member 51 is located in the contained position (NO at S404), the document feeder 2 causes the operation panel 101 to display an instruction to move the buckling preventing member 51 to the operating position (see FIG. 20) (S405). Viewing the display on the operation panel 101, the user pulls out the buckling preventing member 51 to the operating position. After detection of the detection part 51a by the position sensor 52 (YES at S406), the document feeder 2 resumes feeding the document.

As described above, the operation panel 101 (see FIG. 20) displays the instruction to place the buckling preventing member 51 in the operating position when the document to feed detected by the thickness sensor 61 is thin paper of a thickness of the prescribed value or less and the buckling preventing member 51 is not located in the operating position. This makes it possible to ensure that the buckling preventing member 51 is placed in the operating position at the time of feeding and reliably prevent the leading end of the document from buckling when ejected to the ejection unit 14.

As another example, the document feeder 2 may include a moving device includes a motor for moving 73 (see FIG. 20) and a rack and a pinion. The motor 73 serves as a driving source to move the buckling preventing member 51 between the operating position and the contained position. When the thickness sensor 61 detects a thin-paper document to feed having a thickness of the prescribed value or less and the position sensor 52 detects the buckling preventing member 51 being in the operating position, the document feeder 2 may automatically control the motor 73 to move the buckling preventing member 51 to the operating position. The driving source that moves the buckling preventing member 51 may be a solenoid.

Fourth Modification

Figure 19:
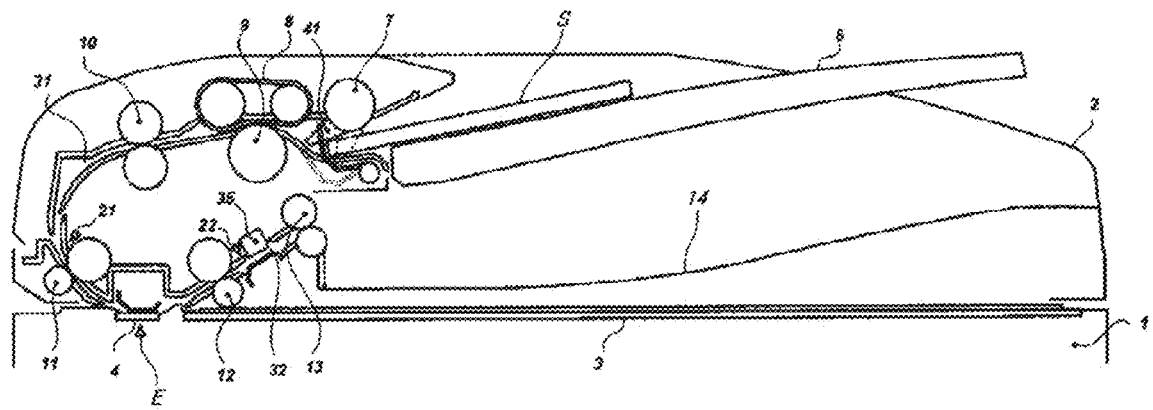
FIG. 19 is a schematic configuration diagram of the automatic document feeder according to a fourth modification.

FIG. 19 is a schematic configuration diagram of an automatic document feeder according to a fourth modification. The automatic document feeder according to the fourth modification includes, between the post-reading roller pair 12 and the ejection roller pair 13, a second image reader 35 that reads the second surface of the document, to be able to read both surfaces of the document through a single path. The automatic document feeder of the fourth modification can improve in productivity in double-sided reading.

Also in the fourth modification, in the image forming apparatus in which waiting for reading may continue for a given period of time or more and/or in the image forming apparatus with low productivity in which the document reading/feeding speed is set to a low speed, the automatic document feeder controls document feeding such that the following document reaches the pre-reading roller pair 11 after the preceding document is ejected. This can prevent occurrence of ejection failure. At a low document reading/feeding speed in the double-side mode, the automatic document feeder increases the feeding speed of the preceding document after the rear end of the preceding document passes through the second image reader 35 (completion of reading the second surface image).

FIG. 20 is a diagram illustrating an example of control blocks of the automatic document feeder. FIG. 20 illustrates the sensors and the mechanisms explained through the embodiment and the first to the third modifications. However, the automatic document feeder may exclude part of the sensors and/or the mechanisms in accordance with the structure of the device, when appropriate. The automatic document feeder includes a controller 70 that controls the various elements and the sensors. The controller 70 is connected to the registration sensor 21, the length sensor 42, the setting sensor 41, and the paper ejection sensor 22. the controller 70 is connected to the paper feeding motor 71 that drives the paper feeding roller 7, the paper feeding belt 8, the reverse roller 9, the pull-out roller pair 10, and the inversion roller pair 16, and the conveying motor 72 that drives the pre-reading roller pair 11, the post-reading roller pair 12, and the ejection roller pair 13.

The controller 70 is also connected to the thickness sensor 61 that detects the thickness of the document, the position sensor 52 that detects the position of the buckling preventing member 51, and the movement motor 73 that moves the buckling preventing member 51.

The image forming apparatus includes the main-unit controller 100 serving as a semiconductor circuit. The main-unit controller 100 includes a central processing unit (CPU) and a random access memory (RAM), and performs control of the various devices and the sensors of the image forming apparatus. The main-unit controller 100 is connected to the controller 70 being a semiconductor circuit through an interface (I/F), for example. The main-unit controller 100 transmits an operation signal of the operation panel 101 and a reading signal to the controller 70. The controller 70 starts feeding the document in accordance with an operation signal such as a press onto the start button of the operation panel 101, and controls the feeding start timing of the document to the reading position E in accordance with a reading signal. The control by the main-unit controller 100 and/or the controller 70 may be software, and the main-unit controller 100 and/or the controller 70 may be loaded to the image forming apparatus 1 or the automatic document feeder 2 via a network.

The embodiment and modifications above have described the example of incorporating the automatic document feeder into an electrophotographic image forming apparatus. However, the automatic document feeder according to the present invention may be incorporated in an inkjet image forming apparatus.

As another example, the present invention is applicable to an image reading device, such as a scanner, including the image reader 81 and the automatic document feeder 2. The present invention is also applicable to a paper feeding device and an image forming apparatus that feeds sheets of paper from the paper cassette.

The structures explained above are presented for exemplary purpose only, and attain particular effects by each of the following modes.

First Mode

A sheet feeding device, such as an automatic document feeder, temporarily stops a sheet such as the document S in a registration position of a non-separable roller pair, such as the pre-reading roller pair 11, and thereafter resumes feeding the sheet. The following sheet reaches the registration position from a separable roller pair, such as the pull-out roller pair 10, after completion of ejection of the preceding sheet.

For the purpose of downsizing and cost reduction, there is a sheet feeding device including one motor that drives non-separable roller pairs, i.e., a pre-reading roller pair to an ejection roller pair that work to stop a sheet fed from separation feeding means at the registration position, and feed the stopped sheet from the registration position to the reading position. Such a sheet feeding device temporarily stops the following sheet by stop driving the motor to stop the rotation of the pre-reading roller pair when the leading end of the following sheet reaches the feeding nip of the pre-reading roller pair or a given registration position between the pre-reading roller pair and the reading position. Thereby, non-separable roller pairs including the paper ejection roller pair, located downstream of the pre-reading roller pair, also stop rotating, temporarily stopping feeding or ejecting the preceding sheet while the rear end of the preceding sheet has not been ejected to the ejection unit. In such a temporary stop period, the air between the leading end of the preceding sheet ejected to the outside of the device and the sheet ejected to the ejection tray is released, causing the leading end of the preceding sheet to tightly contact with the ejected sheet. As a result, at the time of resuming feeding the sheet, the contacting force, i.e., static friction force between the leading end of the preceding sheet and the ejected sheet may cause the leading end of the preceding sheet to not slide but stay on the surface of the ejected sheet and the rear end of the preceding sheet to be ejected in a undulated manner. Because of this, paper jam or ejection failure may occur, such as the ejected sheet fed together with the preceding sheet and falling out from the ejection tray.

In view of this, for example, the pre-reading roller pair may be configured to receive the driving force of the motor via a clutch. The pre-reading roller pair alone is stopped by disengaging the clutch when the leading end of the following sheet reaches the registration position. Thereby, the preceding sheet is ejected to the ejection tray while the following sheet is being temporarily stopped at the registration position. However, this may increase the size and cost of the device due to increase in number of parts and components.

For this reason, in the first mode the following sheet reaches the registration position from the separable roller pair, such as the pull-out roller pair 10, after ejection of the preceding sheet is completed. By such a feeding control of the following sheet, the preceding sheet has already been ejected to the ejection tray when the following sheet is temporarily stopped at the registration position. This structure prevents occurrence of ejection failure.

The following sheet reaches the registration position from the separable roller pair after ejection of the preceding sheet is completed. Thereby, in the case of removing the following sheet together with the preceding sheet remaining in the device due to ejection failure, such as paper jam, the sheet is located not at the non-separable roller pairs, such as the pre-reading roller pair 11, but at the separable roller pair. Thus, the sheet can be removed without damage.

Second Mode

In the first mode, the registration position is set upstream of the image reading position in the sheet feeding direction.

Third Mode

In the second mode, the sheet feeding device feeds the sheets such that the following sheet reaches the registration position from the separable roller pair after completion of ejection of a preceding sheet, when it takes a prescribed time or more from completion of reading an image of the preceding sheet to start of reading the following sheet.

Thereby, as explained in the embodiment, the sheet feeding device may be, for example, mounted in the image forming apparatus with no HDD that may thus take a longer time to transmit a read instruction signal to the following sheet due to waiting for write during the printing process. In such a case, it may take a prescribed time or more from completion of the image reading of the preceding sheet to start of reading the following sheet (in the present embodiment, from the rear end of the preceding sheet passing through the reading position to resuming feeding the following sheet in response to reception of the reading instruction signal), which is likely to cause waiting for reading at the registration position to continue for a given period of time, leading to the ejection failure as described above. Thus, the sheet feeding device feeds the following sheet to the registration position after ejection of the preceding sheet is completed, when it takes a prescribed time or more to start of reading the following sheet from completion of reading the preceding sheet. This enables prevention of ejection failure.

The sheet feeding device may be, for example, mounted in the image forming apparatus with an HDD, irrespective of waiting for write during the printing process, which requires a smaller time from completion of image reading of the preceding document to reception of the read instruction signal to the following sheet. In such a case, when it takes a smaller time than the prescribed time from completion of the image reading of the preceding sheet to start of reading to the following sheet, the sheet feeding device can feed the following sheet to the registration position before the preceding sheet is ejected, to start reading the following image before ejection of the preceding sheet is completed. Thereby, a decline in productivity can be prevented.

Fourth Mode

In any one of the first mode to the third mode, the sheet feeding device feeds the following sheet to the registration position after ejection of the preceding sheet is completed, when the sheet to feed has a certain length or more.

As explained in the first modification, as to the sheet having a length shorter than the certain length, the preceding sheet is in no contact with the sheet on the ejection unit 14 at the time of temporarily stopping feeding the following sheet at the registration position, that is, no contact force occurs between the preceding sheet and the sheet placed on the ejection unit 14, or the preceding sheet is almost in no contact with the sheet on the ejection unit 14 and no increased contact force occurs therebetween. In other words, temporary stop of ejection of the preceding sheet is unlikely to cause ejection failure. Thus, in the case of the sheet to feed having the certain length or longer, the sheet feeding device feeds the following sheet to the registration position after ejection of the preceding sheet is completed. Thereby, the sheet feeding device can prevent ejection failure and a decline in productivity when the sheet length is less than the certain length.

Fifth Mode

In any one of the first mode to the fourth mode, the sheet feeding device feeds the following sheet to the registration position after ejection of the preceding sheet is completed, when the sheet to feed has a certain thickness or less.

As illustrated in the second modification, as to the sheet having a certain thickness or more, the following sheet reaches the registration position and temporarily stops there, and the preceding sheet may tightly contact with the sheet on the ejection unit 14. In such a case the preceding sheet is not bent due to its strength at the time of resuming feeding, and the contact area is properly applied with the feeding force. As a result, the preceding sheet can slide on the sheet on the ejection unit 14, and be properly ejected. Thus, regarding the sheets having a certain thickness or less, the sheet feeding device feeds the following sheet to the registration position after ejection of the preceding sheet is completed, to be able to prevent ejection failure and a decline in productivity when the sheets have a certain thickness or more.

Sixth Mode

In any one of the first mode to the fifth mode, the sheet feeding device includes a projection member (the projection 50 and the buckling preventing member 51 in the present embodiment) located in the center of the width of a sheet on the sheet ejection unit, such as the ejection unit 14. The projection member projects from the sheet placement surface of the sheet ejection unit.

As illustrated in the third modification, the sheet ejection unit such as the ejection unit 14 is provided with the projection member, so that the projection member can contact the leading end of the sheet having low strength with a certain thickness or less. Thereby, the leading end of the sheet having a certain thickness or less can be curved along the width, increasing strength against bending in the feeding direction. This can prevent the leading end of the sheet from buckling.

Seventh Mode

In the sixth mode, the projection member, such as the buckling preventing member 51, is movable.

As explained in the third modification, as to the sheets having the certain thickness or less, the projection member, such as the buckling preventing member 51, is moved to a given position, such as the operating position, to curve the leading end of the sheet having a certain thickness or less along the width and increase the strength of the sheet against bending in the feeding direction. This can prevent the leading end of the sheet from buckling. As to the sheets having the certain thickness or more, the projection member is moved to a retracted position, such as the contained position, from the given position downstream in the sheet feeding direction. This can increase the space upstream of the sheet ejection unit, and prevents decrease in stacking capacity.

Eighth Mode

In the seventh mode, the sheet feeding device includes a detector, such as the position sensor 52, which detects the projection member such as the buckling preventing member 51 being in the given position such as the operating position. The sheet feeding device feeds the following sheet to the registration position after ejection of the preceding sheet is completed, when the projection member is located in the given position.

Thus, the projection member such as the buckling preventing member 51 is located in the given position such as the operating position, when the sheet has a certain thickness or less. In other words, the projection member located in the given position signifies that the sheet to feed has a certain thickness or less. In response to detection of the projection member in the given position by the detector such as the position sensor 52, the sheet feeding device feeds the following sheet to the registration position after ejection of the preceding sheet is completed. Thereby, as to the sheets having a certain thickness or less, the following sheet can reach the registration position after ejection of the preceding sheet is completed, which can prevent ejection failure and a decline in productivity in the case of the sheets having a certain thickness or less.

Ninth Mode

In the seventh mode or the eighth mode, the sheet feeding device includes a thickness detector, such as the thickness sensor 61, which detects the thickness of the sheet, and includes a display, such as the operation panel 101. The display functions to display an instruction to move the projection member to the given position, when the thickness detector detects the sheet having a certain thickness or less and when the detector does not detect the projection member, such as the buckling preventing member 51, in the operating position.

Thereby, as explained in the third modification, the projection member such as the buckling preventing member 51 can be reliably located in the given position, such as the operating position, when the sheet has a given thickness or less.

Tenth Mode

In the seventh mode or the eighth mode, the sheet feeding device includes a thickness detector, such as the thickness sensor 61, which detects the thickness of the sheet, and a driving source, such as the motor for moving 73 that moves the projection member, such as the buckling preventing member 51. The driving source moves the buckling preventing member 51 to the given position when thickness detector detects the sheet having a certain thickness or less.

As explained in the third modification, the projection member such as the buckling preventing member 51 can be reliably located in the given position such as the operating position, when the sheet has a given thickness or less.

Eleventh mode

In any one of the first mode to the tenth mode, the sheet feeding device feeds the following sheet to the registration position after ejection of the preceding sheet is completed, when the sheet reading/feeding speed at the time of the sheet passing through the image reading position is equal to or smaller than the prescribed value.

As explained in the embodiment, the sheet or document reading/feeding speed, at the time of the sheet passing through the image reading position, is set according to the productivity of the image forming apparatus including the sheet feeding device. Thereby, in the image forming apparatus with lower productivity, the sheet or document reading/ feeding speed can be lowered in accordance with the productivity of the image forming apparatus, thereby suppressing noise thereof.

While the image of the following document is being read, the preceding document is being ejected to the ejection unit 14. In view of downsizing and cost reduction, the sheet feeding device may include one motor that drives non-separable roller pairs from the pre-reading roller pair 11 disposed before the image reading position to the ejection roller pair 13. In such a case the preceding document is ejected to the outside of the device at the sheet reading/feeding speed. Thus, at a lowered sheet reading/feeding speed in accordance with the productivity of the image forming apparatus, the preceding sheet may be ejected less quickly, which may cause ejection failure as the rear end remaining at the ejection roller pair 1.

Meanwhile, in the eleventh mode, the sheet feeding device feeds the following sheet not to the reading position during ejection of the preceding sheet but to the registration position after completion of ejection of the preceding sheet, when the sheet reading/feeding speed is equal to or lower than the prescribed value. This makes it possible to eject the preceding sheet at a feeding speed higher than the sheet reading/feeding speed. Thereby, the preceding sheet can be quickly ejected to the outside of the device, preventing occurrence of ejection failure as the rear end remaining at the ejection roller pair 13.

Twelfth Mode

In the eleventh mode, the preceding sheet is fed at a feeding speed higher than the sheet reading/feeding speed, when the rear end of the preceding sheet in the feeding direction passes through the image reading position.

Thereby, as explained in the embodiment, the preceding sheet can be quickly ejected to the outside of the device, preventing occurrence of ejection failure as the rear end remaining at the ejection roller pair 13.

Thirteenth Mode

In any one of the first mode to the twelfth modes, the non-separable roller pair is the pre-reading roller pair 11 initially disposed upstream of the image reading position, such as the reading position E, in the sheet feeding direction.

Thereby, the sheet can be temporarily stopped at the registration position by stopping the rotation of the pre-reading roller pair 11. The temporarily stopped sheet can be fed from the registration position to the image reading position by resuming the rotation of the pre-reading roller pair 11.

Fourteenth Mode

In any one of the first mode to the thirteenth mode, the pre-reading roller pair 11 and the ejection roller pair 13 are driven by the same driving source.

Thereby, the sheet feeding device can be decreased in size and cost, as explained in the embodiment.

Fifteenth Mode

An image reading device includes a document feeder that feeds a document sheet, and an image reader 81 that reads an image on the document sheet fed by the document feeder. The document feeder includes the sheet feeding device according to any one of the first mode to the fourteenth mode.

Such an image reading device can prevent occurrence of ejection failure of a document sheet.

Sixteenth Mode

An image forming apparatus includes a document feeder that feeds a document sheet, and an image reader 81 that reads an image on the document sheet fed by the document feeder, to form an image on the basis of image information read by the image reader 81. The document feeder includes the sheet feeding device according to any one of the first mode to the fourteenth mode.

Such an image forming apparatus can prevent occurrence of ejection failure of a document sheet.

According to the present invention, it is made possible to prevent the occurrence of sheet ejection failure, and facilitate removal of a sheet, if remaining in the device, causing no damage to the sheet.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed thus.

What is claimed is:

1. A sheet feeding device comprising:
a roller pair being mutually non-separable;
a roller pair being mutually separable; and
a controller configured to temporarily stop a sheet in a registration position of the non-separable roller pair and then resume feeding the sheet such that a following sheet reaches the registration position from the separable roller pair after completion of ejection of a preceding sheet onto a sheet ejection tray, wherein
the sheet feeding device is configured to feed sheets such that the following sheet reaches the registration position from the separable roller pair after completion of ejection of the preceding sheet, in response to the preceding sheet passing through an image reading position at a reading and feeding speed of a prescribed value or less, and
the sheet feeding device is configured to feed the preceding sheet at a feeding speed higher than the sheet reading and feeding speed of the prescribed value or less, after a rear end of the preceding sheet passes through the image reading position in a sheet feeding direction.

2. A sheet feeding device comprising:
a roller pair being mutually non-separable;
a roller pair being mutually separable;
a controller configured to temporarily stop a sheet in a registration position of the non-separable roller pair and then resume feeding the sheet such that a following sheet reaches the registration position from the separable roller pair after completion of ejection of a preceding sheet onto a sheet ejection tray; and
an ejection roller pair that ejects the sheets, wherein
the non-separable roller pair serves as a pre-reading roller pair initially disposed upstream of an image reading position in a sheet feeding direction, and the pre-reading roller pair and the ejection roller pair are driven by the same driving source.

3. A sheet feeding device comprising:
a roller pair being mutually non-separable;
a roller pair being mutually separable;
an ejection roller pair configured to eject sheets onto a sheet ejection tray; and
a driving source configured to drive both the non-separable roller pair and the ejection roller pair, wherein
the sheet feeding device is configured to temporarily stop a sheet in a registration position of the non-separable roller pair and then resume feeding the sheet such that a following sheet reaches the registration position from the separable roller pair after the ejection roller pair completes ejection of a preceding sheet.

4. The sheet feeding device according to claim 3, wherein the registration position is set upstream of an image reading position in a sheet feeding direction.

5. The sheet feeding device according to claim 4, wherein the sheet feeding device is configured to feed sheets such that the following sheet reaches the registration position from the separable roller pair after completion of ejection of a preceding sheet, when it takes a prescribed length of time or more from completion of image reading of the preceding sheet to start of reading the following sheet.

6. The sheet feeding device according to claim 3, wherein the sheet feeding device is configured to feed sheets such that the following sheet reaches the registration position from the separable roller pair after completion of ejection of the preceding sheet, when the sheets to feed have a certain length or more.

7. The sheet feeding device according to claim 3, wherein the sheet feeding device is configured to feed sheets such that the following sheet reaches the registration position from the separable roller pair after completion of ejection of the preceding sheet, when the sheets have a certain thickness or less.

8. The sheet feeding device according to claim 3, further comprising:
a projection member located in a center of width of the sheet ejection tray, and projecting from a sheet placement surface.

9. The sheet feeding device according to claim 8, wherein the projection member is movable.

10. The sheet feeding device according to claim 9, further comprising:
a detector configured to detect the projection member being in a given position, wherein
the sheet feeding device is configured to feed sheets such that the following sheet reaches the registration position from the separable roller pair after completion of ejection of the preceding sheet, in response to detection of the projection member being in the given position.

11. The sheet feeding device according to claim 10, further comprising:
a thickness detector configured to detect a thickness of the sheet; and
a display configured to display an instruction for moving the projection member to the given position, in response to detection of the sheet having a thickness of a given value or less by the thickness detector.

12. The sheet feeding device according to claim 10, further comprising:
a thickness detector configured to detect a thickness of the sheet; and
a driving source configured to move the projection member, wherein
the driving source is configured to move the projection member to the given position in response to detection of the sheet having a thickness of a given value or less by the thickness detector.

13. The sheet feeding device according to claim 3, wherein
the sheet feeding device is configured to feed sheets such that the following sheet reaches the registration position from the separable roller pair after completion of ejection of the preceding sheet, in response to the preceding sheet passing through an image reading position at a reading and feeding speed of a prescribed value or less.

14. The sheet feeding device according to claim 3, wherein
the non-separable roller pair serves as a pre-reading roller pair initially disposed upstream of an image reading position in a sheet feeding direction.

15. An image reading device comprising:
a document feeder configured to feed a document sheet; and
an image reader configured to read an image on the document sheet fed by the document feeder, wherein
the document feeder includes the sheet feeding device according to claim 3.

16. An image forming apparatus comprising:
a document feeder configured to feed a document sheet; and
an image reader configured to read an image on the document sheet fed by the document feeder,
wherein the image forming apparatus is configured to form an image in accordance with image information read by the image reader, and
wherein the document feeder includes the sheet feeding device according to claim 3.

* * * * *